(12) United States Patent
Kusanagi

(10) Patent No.: US 6,670,966 B1
(45) Date of Patent: Dec. 30, 2003

(54) EDIT DATA CREATING DEVICE AND EDIT DATA CREATING METHOD

(75) Inventor: Kou Kusanagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/582,941

(22) PCT Filed: Nov. 9, 1999

(86) PCT No.: PCT/JP99/06229

§ 371 (c)(1),
(2), (4) Date: Sep. 26, 2000

(87) PCT Pub. No.: WO00/28543

PCT Pub. Date: May 18, 2000

(30) Foreign Application Priority Data

Nov. 10, 1998 (JP) .......................................... P10-336597

(51) Int. Cl.⁷ ................................................. G06F 3/00
(52) U.S. Cl. ....................... 345/723; 345/716; 345/719; 345/725
(58) Field of Search ................................. 345/716, 723, 345/724, 725, 764, 769, 770, 719; 715/500.1

(56) References Cited

U.S. PATENT DOCUMENTS

| | | | | |
|---|---|---|---|---|
| 5,339,393 A | * | 8/1994 | Duffy et al. ................ | 345/723 |
| 5,442,744 A | * | 8/1995 | Piech et al. ................ | 715/500.1 |
| 5,760,767 A | * | 6/1998 | Shore et al. ................ | 345/723 |
| 5,781,188 A | * | 7/1998 | Amiot et al. ................ | 345/723 |
| 6,026,389 A | * | 2/2000 | Nakajima et al. ............. | 707/1 |
| 6,236,802 B1 | * | 5/2001 | Yamamoto ................... | 386/52 |

FOREIGN PATENT DOCUMENTS

| | | |
|---|---|---|
| JP | 6-43839 | 2/1994 |
| JP | 6-348799 | 12/1994 |
| JP | 7-508861 | 9/1995 |
| JP | 10-290418 | 10/1998 |
| WO | WO 93/21588 | 10/1993 |

OTHER PUBLICATIONS

"Adobi konin training book, Adobi puremia Kyoshitsu 5.0", Macintosh & Windows, Japan, (Kaushiki Kaisha MDN Corp.), Sep. 11, 1998.

* cited by examiner

Primary Examiner—John Cabeca
Assistant Examiner—Kieu D. Vu
(74) Attorney, Agent, or Firm—Frommer Lawrence & Haug LLP; William S. Frommer; Glenn F. Savit

(57) ABSTRACT

An edit data creation apparatus and method creates edit data specifying editing contents to arbitrarily combine edit materials. Positions of the edit materials are moved on the edit data. Adjustments are made to an end point of a first adjacent edit material upstream of the relevant edit material, and to a start point of a second adjacent edit material downstream of the relevant edit material according to the amount of movement of their respective edit materials. As a result, even if the edit materials are moved, it is possible to maintain the continuity between the adjacent edit materials on both sides and the moved edit material.

10 Claims, 28 Drawing Sheets

EDIT DATA CREATING DEVICE AND EDIT DATA CREATING METHOD

TECHNICAL FIELD

The present invention relates to an apparatus and a method for creating edit data and is ideally applicable to apparatuses and methods for creating edit data to perform editing processing that arbitrarily combines a plurality of edit materials.

BACKGROUND ART

At the time of creating edit data that specifies editing contents to create edit video/voice by arbitrarily combining a plurality of edit materials, it is conventionally conceivable that the edit materials can be fitted in optimal positions by arbitrarily moving an arbitrary edit material on the edit data.

However, in such edit data creation, there has been a problem that moving the arbitrary edit material would cause the continuity between the edit material to be moved and the adjacent edit materials to be lost.

Furthermore, at the time of creating edit data that specifies editing contents to create edit video/voice by arbitrarily combining a plurality of edit materials, it is conventionally conceivable that without arbitrarily moving any position of an arbitrary edit material on the edit data, moving the contents of the relevant edit material on the original material would further optimize the contents of the edit material.

However, such edit data creation involves a problem of requiring complicated work that the material contents of the arbitrary edit material after being arranged on the IN point side must be further arranged on the OUT point side.

Furthermore, at the time of creating edit video/voice by arbitrarily combining a plurality of edit materials, it is a conventional practice that edit data creation for video materials and edit data creation for voice materials are separately performed and editing such as combination of edit materials is performed based on this edit data.

However, such an edit data creation involves a problem of requiring complicated editing work because edit data corresponding to the video materials and edit data corresponding to the voice materials are separately created.

Furthermore, for edit data to create a series of edit video/voice, editing the beginning of the edit data requires a reconfiguration of the edit data by moving back or forth the part of the edit data that follows by the length corresponding to the edited part at the beginning, causing a problem of making the editing work complicated.

Furthermore, at the time of creating edit video/voice by arbitrarily combining a plurality of edit materials, it is conventionally necessary to find editing points to combine those edit materials frame by frame and correctly paste the edit materials at the corresponding edit points.

However, such an edit data creation that specifies the editing contents has a problem of making the work of preparing an editing list more complicated to find the editing points correctly.

Moreover, for edit data to create a series of edit video/voice, inserting a new edit material to part of the edit data requires the insertion part to be accurately found frame by frame, causing a problem of making the editing list creating work more complicated.

Furthermore, at the time of creating edit data that specifies editing contents to create edit video/voice by arbitrarily combining a plurality of edit materials, it is conventionally conceivable that by changing the length of an arbitrary edit material of the plurality of combined edit materials, it would be possible to adjust the edit material in question to a length best suited to editing.

However, such an edit data creation requires complicated editing work; changing the length of the edit material and manually moving the edit materials following the edit material in question by the change in length.

DISCLOSURE OF INVENTION

The present invention has been implemented taking into account the points described above and it is an objective of the present invention to provide an edit data creation apparatus and edit data creation method capable of further simplifying edit data creation.

In order to solve the aforementioned problems, at the time of creating edit data that specifies editing contents to arbitrarily combine edit materials, the present invention moves the position of an edit material on edit data, adjusts the end point of a first adjacent edit material that is adjacent to the moved edit material on the upstream side on the time axis rather than the edit material and the start point of a second adjacent edit material that is adjacent to the moved edit material on the downstream side on the time axis according to the amount of movement of the edit material rather than the edit material, thereby maintaining the continuity between the moved edit material and the adjacent edit materials on both sides of the moved edit material.

Furthermore, at the time of extracting part of data on the original material, arbitrarily combining the extracted edit materials into edited data, creating edit data that specifies the editing contents, the present invention moves the contents of the edit material on the original material while maintaining the position of the edit material on the edit data, changes the contents of the edit material at the position where the edit material is maintained, thereby allowing the contents to be changed without moving any position of the edit material on the edit data.

Furthermore, at the time of carrying out editing on the edit data, the present invention sets an edit data change area that changes the edit data in the edit data, allowing influences of the editing to be reflected in only the edit data desired by the operator in the editing on the edit data, thereby making it possible to maintain the correlation between different edit materials before the editing.

Furthermore, at the time of creating edit data that specifies editing contents for arbitrarily combining edit materials, the present invention presets an editing point for editing on the edit data and inserts a new edit material on the edit data based on the set editing point, thereby allowing the operator to easily insert the new edit material at a desired position on the edit data.

Furthermore, at the time of creating edit data that specifies editing contents for arbitrarily combining edit materials, the present invention adjusts the start point or end point of an arbitrary edit material on the edit data as the adjustment point, changes the length of the edit material on the edit data and moves the edit data at and after the adjustment point of the edit material according to the adjustment of the adjustment point, thereby making it possible to adjust the length of the desired edit material on the edit data while maintaining the correlation and continuity between different edit materials at and after the adjustment point.

BEST MODE FOR CARRYING OUT THE INVENTION

With reference now to the attached drawings, an embodiment of the present invention will be explained in detail below.

(1) Overall Configuration of Editing Apparatus

Figure 1:
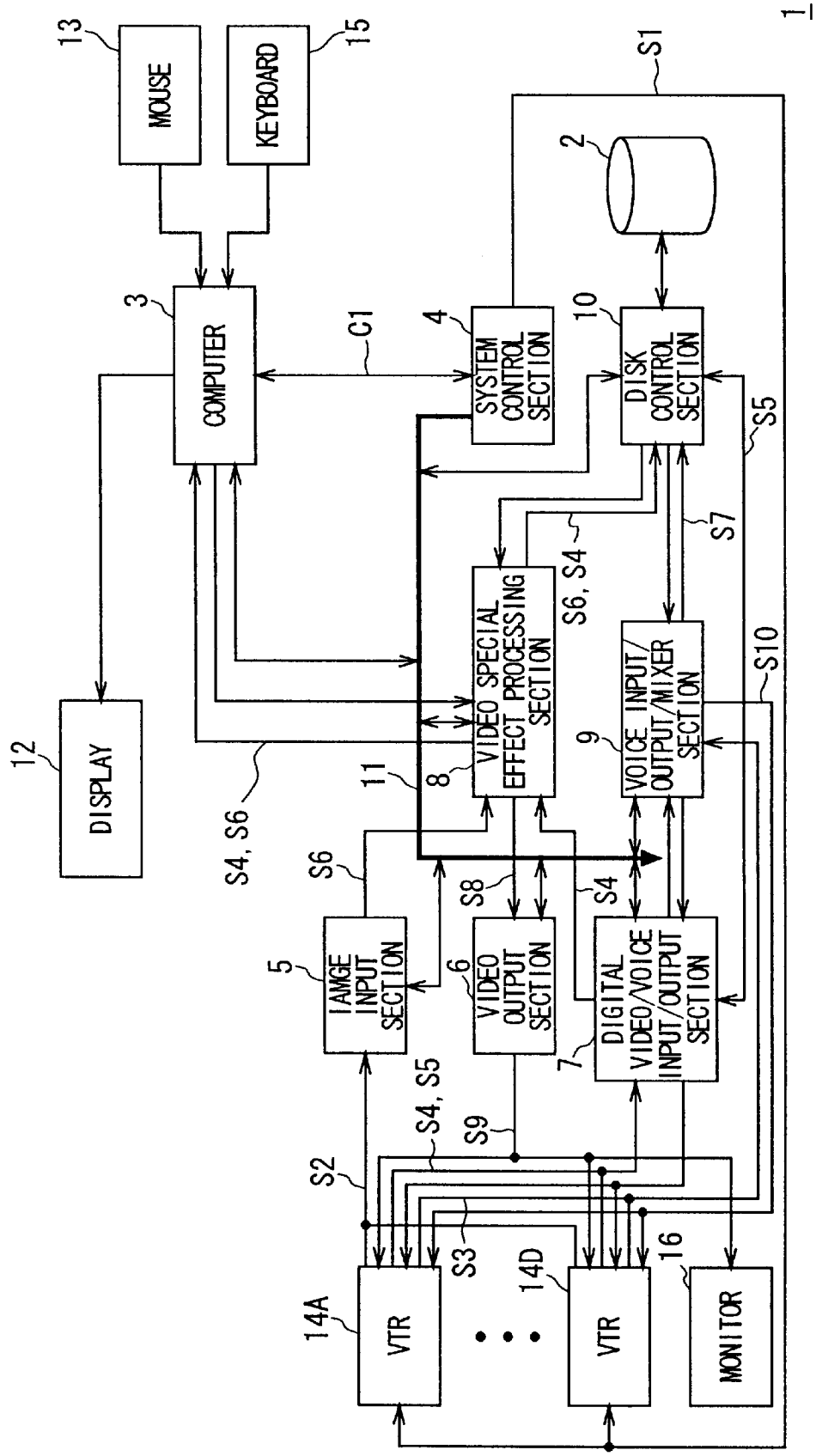
FIG. 1 is a block diagram showing an overall configuration of an editing apparatus comprising an edit data creation apparatus of the present invention.

In FIG. 1, 1 as a whole represents an editing apparatus comprising an edit data creation apparatus of the present invention, capable of registering a desired part of video/voice recorded in a video tape as a material (hereafter referred to as "clip") and at this time capturing the video signal and voice signal of the desired clip into a hard disk apparatus 2.

Furthermore, this editing apparatus 1 is designed to be able to combine registered clips into a desired condition and create edit data that specifies editing contents to acquire desired edit video/voice and carry out editing according to this created edit data.

That is, this editing apparatus 1 comprises a computer 3, a system control section 4, a video input section 5, a video output section 6, a digital video/voice input/output section 7, a video special effect processing section 8, a voice input/output/mixer section 9 and a disk control section 10, all connected via a control bus 11.

In this case, the computer 3 initially displays a predetermined operation screen (hereafter referred to as "main screen") on a display 12. In this state, if a clip registration mode is selected by operating a mouse 13 and a replay operation command of one of a plurality of video cassette recorders 14A to 14D connected to the editing apparatus 1 is input, the computer 3 sends a corresponding control command C1 to the system control section 4.

The system control section 4 sends a control signal S1 to the corresponding one of the video cassette recorders 14A to 14D based on the supplied control command C1 to carry out a replay operation of the video signal and voice signal recorded in the video tape.

As a result, these video cassette recorders 14A to 14D output an analog video signal S2 and an analog voice signal S3, and a digital video signal S4 and a digital voice signal S5, and the analog video signal S2 and analog voice signal S3 are input to the video input section 5 and the voice input/output/mixer section 9, respectively and the digital video signal S4 and digital voice signal S5 are input to the digital video/voice input/output section 7, respectively.

At this time, the system control section 4 controls either one of the video input section 5, voice input/output/mixer section 9 and digital video/voice input/output section 7 via the control bus 11 to capture only one of the analog video signal S2 and analog voice signal S3 output from the video cassette recorders 14A to 14D and the digital video signal S4 and digital voice signal S5.

In this way, if the analog video signal S2 is captured via the video input section 5, this is converted to a digital signal in the video input section 5 and then input to the video special effect processing section 8 as a digital video signal S6, and if the digital video signal S4 is captured via the digital video/voice input/output section 7, this is directly input to the video special effect processing section 8.

At this time, the video special effect processing section 8, under the control of the system control section 4, sends the digital video signals S6 and S4 supplied from the video input section 5 or the digital video/voice input/output section 7, respectively, to the computer 3. In this way, the display 12 shows an image based on the digital video signal S6 or S4 under the control of the main control section 4 at a predetermined position on the main screen.

At this time, if the analog voice signal S3 is captured, this is sent directly from the voice input/output/mixer section 9 to a speaker, which is not shown in the figure, and if the digital voice signal S5 is captured, this is converted to an analog signal in the voice input/output/mixer section 9 and then sent to the speaker.

As shown above, in the editing apparatus 1, based on the video displayed on the display 12 and the voice output from the speaker, the operator can specify a desired part of the video and voice using the mouse 13 and keyboard 15, and further can use this part as a clip and register related data such as a time code at the IN point and OUT point of the clip and material length (duration) in the computer 3.

At this time, if a capturing mode is selected beforehand, the computer 3 sends the control command C1 according to this to the system control section 4.

Based on the supplied control command C1, the system control section 4 sends a control signal S1 to the corresponding video cassette recorder 14A to 14D to let the corresponding video cassette recorder 14A to 14D replay the video/voice of the registered clip on one hand, and controls either one of the video input section 5, the voice input/output/mixer section 9 and the digital video/voice input/output section 7 via the control bus 11 to let it capture either one of the analog video signal S2 and analog voice signal S3 output from the video cassette recorders 14A to 14D and the digital video signal S4 and the digital voice signal S5 on the other.

As a result, if the analog video signal S2 is captured via the video input section 5, this is converted to a digital signal by the video input section 5 and then sent to the disk control section 10 via the video special effect processing section 8 as the digital video signal S6, and if the digital video signal S4 is captured via the digital video/voice input/output section 7, this is directly sent to the disk control section 10.

At this time, if the analog voice signal S3 is captured via the voice input/output/mixer section 9, this is converted to a digital signal in voice input/output/mixer section 9 and then sent to the disk control section 10 as the digital voice signal S7, and if the digital voice signal S5 is captured via the digital video/voice input/output section 9, this is sent directly to the disk control section 10.

Then, at this time, based on a command given from the system control section 4 via the control bus 11, the disk control section 10 captures the digital video signals S6 and S4 given from the video special effect processing section 8 or digital video/voice input/output section 7 and digital voice signals S7 and S5 given from the voice input/output/mixer section 9 or digital video/voice input/output section 7 sequentially and gives these signals to the hard disk apparatus 2 and lets the hard disk record them at specified addresses on the hard disk.

In this way, the editing apparatus 1 is designed to be able to reproduce the video/voice of the registered clip from the video tape and capture it into the hard disk apparatus 2.

On the other hand, once the clip is registered as shown above, the computer 3 lets the display 12 show the list of registered clips on the main screen.

Then, the operator can create edit data that specifies editing contents such as which clips should be combined and how, as an editing list using this main screen. Furthermore, the operator can further check the editing video and editing voice based on the editing list after or in the middle of creating the editing list.

In practice, if a preview mode of the edit video/voice is selected based on the editing list after or in the middle of creating the editing list, the computer 3 sends the control command C1 according to this to the system control section 4.

Based on the supplied control command C1, the system control section 4 sends the control signal S1 to the corresponding video cassette recorder 14A to 14D as required, letting the corresponding video cassette recorder 14A to 14D reproduce the video/voice of the clip used for editing on one hand, and controls the disk control section 10 via the control bus 11 as required, letting the hard disk apparatus 2 reproduce the video/voice of the clip used for editing on the other.

As a result, the analog video signal S2 and analog voice signal S3, and the digital video signal S4 and digital voice signal S5 of the specified clip are output from this video cassette recorder 14A to 14D, and the analog video signal S2 and analog voice signal S3 are given to the video input section 5 or voice input/output/mixer section 9, respectively, and the digital video signal S4 and the digital voice signal S5 are given to the digital video/voice input/output section 7.

At this time, the system control section 4 controls either one of the video input section 5, the voice input/output/mixer section 9 or the digital video/voice input/output section 7 via the control bus 11 to capture only one of the analog video signal S2 and analog voice signal S3 output from the video cassette recorders 14A to 14D or the digital video signal S4 and digital voice signal S5.

Thus, if the analog video signal S2 is captured via the video input section 5, this signal is converted to a digital signal by the video input section 5 and then given to the video special effect processing section 8 as the digital video signal S6, and if the digital video signal S4 is captured via the digital video/voice input/output section 7, this signal is directly given to the video special effect processing section 8.

At this time, under the control of the system control section 4, the video special effect processing section 8 carries out special effect processing on the digital video signals S6 and S4 of their respective supplied clips into their specified conditions as required. Furthermore, at this time, the video special effect processing section 8 inserts title characters and image data such as various graphics given from the main control section 4 as required into the digital video signals S6 and S4 of their respective clips or superimposes those title characters and image data over the digital video signals S6 and S4, and sends the digital edit video signal S8 obtained in this way to the image output section 6.

Then, under the control of the system control section 4, the image output section 6 converts the supplied digital edit video signal S8 to an analog signal and sends the edit video signal S9 obtained to the monitor 16.

At this time, if, of the analog voice signal S3 and the digital voice signal S5 output from the video cassette recorders 14A to 14D, the analog voice signal S3 is captured via the voice input/output/mixer section 9, this signal is subjected to editing such as mixing by the voice input/output/mixer section 9 as required and then sent to the speaker as the edited voice signal. If the digital voice signal S5 is captured via the digital video/voice input/output section 7, this signal is converted to an analog signal by the voice input/output/mixer section 9, subjected to editing such as mixing and then sent to the speaker as the edited voice signal.

As a result, this editing apparatus 1 displays the edited video on the monitor 16 based on the edited video signal S9 and outputs the edited voice from the speaker based on the edited voice signal, and in this way allows the operator to check the edited video and edited voice based on the editing list.

Moreover, once the editing list is created and then the mouse 13 or keyboard 15 is operated to input a command for execution, the computer 3 sends the control command C1 to the system control section 4 in response to this.

Based on the supplied control command C1, the system control section 4 sends the control signal S1 to the corresponding video cassette recorder 14A to 14D as required letting the corresponding video cassette recorder 14A to 14D reproduce the video/voice of the clip to be used for editing on one hand, and controls the disk control section 10 via the control bus 11 as required letting the hard disk apparatus 2 reproduce the video/voice of the clip to be used for editing on the other.

As a result, as in case of the aforementioned preview mode, the digital video signals S6 and S4 of the necessary clip are given from the video cassette recorders 14A to 14D to the video special effect processing section 8 via the video input section 5 or digital video/voice input/output section 7, or the digital video signals S6 and S4 of the necessary clip are given from the hard disk apparatus 2 via the disk control section 10.

At this time, the analog voice signal S3 or digital voice signal S5 of the necessary clip is given from the video cassette recorders 14A to 14D to the voice input/output/mixer section 9 directly or via the digital video/voice input/output section 7, or the digital voice signal S7 or S5 of the necessary clip is given from the hard disk apparatus 2 via the disk control section 10.

Then, under the control of the system control section 4, as in case of the aforementioned preview mode, the video special effect processing section 8 carries out special effect processing on the digital video signals S6 and S4 of each supplied clip as required and sends the digital edited video signal S8 made up of the video signal of the edited video obtained in this way to the video output section 6.

At this time, under the control of the system control section 4, the video output section 6 converts the supplied digital edited video signal S8 to an analog signal and sends the edited video signal S9 obtained to the corresponding video cassette recorder 14A to 14D.

Furthermore, under the control of the system control section, as in case of the aforementioned preview mode, the voice input/output/mixer section 9 carries out editing processing such as mixing on the analog voice signal S2 or digital voice signals S5 and S7 of their respective supplied clips at need and sends the edited voice signal S10 obtained in this way to the corresponding video cassette recorder 14A to 14D.

At this time, the control signal S1 has been given from the system control section 4 to the video cassette recorders 14A to 14D, and based on this control signal S1, the corresponding video cassette recorder 14A to 14D records the edited video signal S9 supplied from the video output section 6 and the edited voice signal S10 supplied from the voice input/output/mixer section 9 at specified positions of the video tape.

Thus, this editing apparatus 1 is designed to be able to edit or process the video/voice of the specified clip into a specified condition according to the created editing list and record the resulting signal in the video tape.

(2) Configuration of Control Computer

Figure 2:
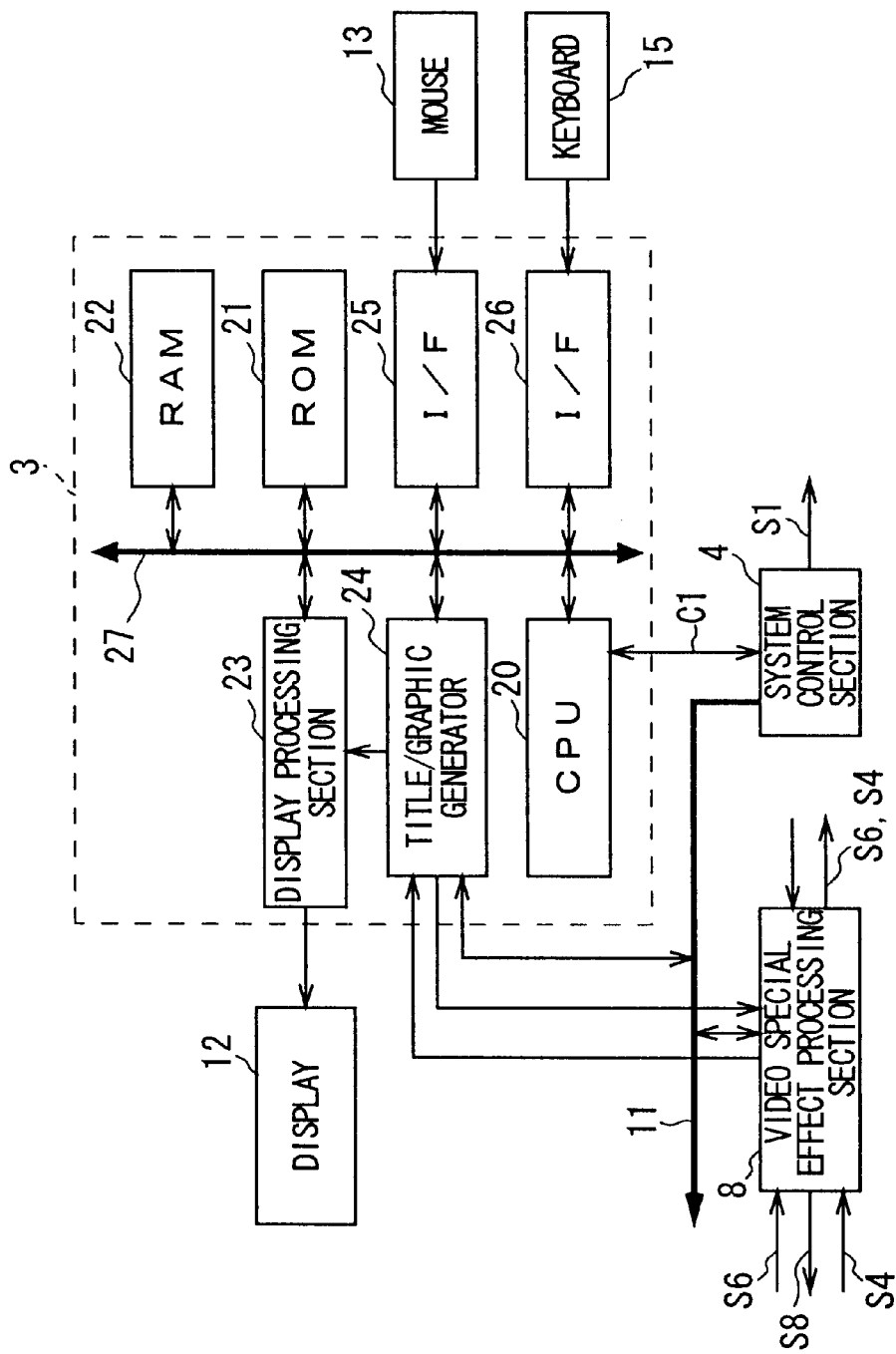
FIG. 2 is a block diagram showing a configuration of a computer of the editing apparatus.

As shown in FIG. 2, the computer 3 comprises a CPU (Central Processing Unit) 20, a ROM (Read Only Memory) 21, a RAM (Random Access Memory) 22, a display processing section 23, a title/graphic generator 24 and interface circuits 25 and 26, connected via a CPU bus 27 and the mouse 13 and a keyboard 15 are connected via the interface circuits 25 and 26, respectively.

In this case, if, for example, the mouse 13 or the keyboard 15 is operated and a command to execute predetermined processing is given via the interface circuits 25 and 26, the CPU 20 sends the control command C1 to the system control section 4 as required based on a program stored in the ROM 21 to instruct the video cassette recorders 14A to 14D, video input/output section 5, video output section 6, digital video/voice input/output section 7, video special effect processing section 8, voice input/output/mixer section 9 and disk control section 10 to perform a predetermined operation via the system control section 4, thereby allowing the editing apparatus 1 as a whole to execute various kinds of processing as described above.

At this time, based on the program stored in the ROM 21, the CPU 20 reads the image data stored in the ROM 21 as required and gives this to the display 12 via the display processing section 23 instructing the display 12 to display the main screen or windows as described later on one hand, and instructs the display 12 to display a cursor that moves on the main screen in response to a mouse operation or numbers or characters input from the keyboard 15 and display a video or still image based on the digital video signal S6 or S4 given from the video special effect processing section 8 to the display processing section 23 via the title/graphic generator 24 at predetermined positions on the main screen.

Furthermore, based on the program stored in the ROM 21, the CPU 20 controls the title/graphic generator 24 as required to generate title characters and graphic image data and send this data to the video special effect processing section 8.

(3) Clip Registration Operation

Figure 3:
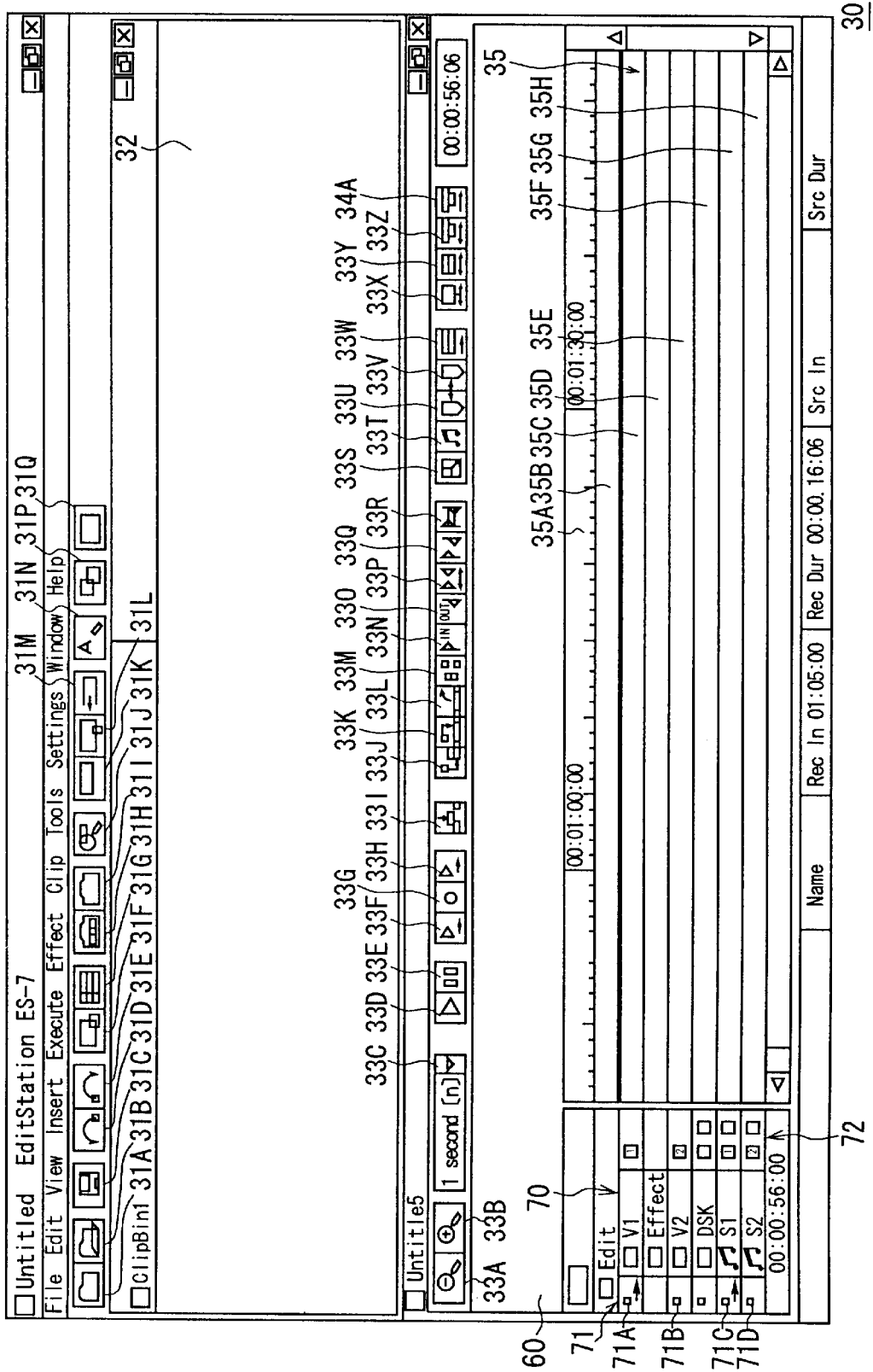
FIG. 3 is an outlined diagram showing a main screen of the GUI.

In practice, when power is turned on, based on the program stored in the ROM 21, the CPU 20 instructs the display to show the main screen 30 as shown in FIG. 3.

In this case, this main screen 30 comprises a plurality of buttons 31A to 31Q for the operator to select desired processing contents, clip display section 32 to display a still image (hereafter referred to as "stamp image") at an IN point of each registered clip, a plurality of buttons 33A to 33Z and 34A to specify various kinds of processing when creating an editing list and editing list creation section 35 to create an editing list.

Figure 4:
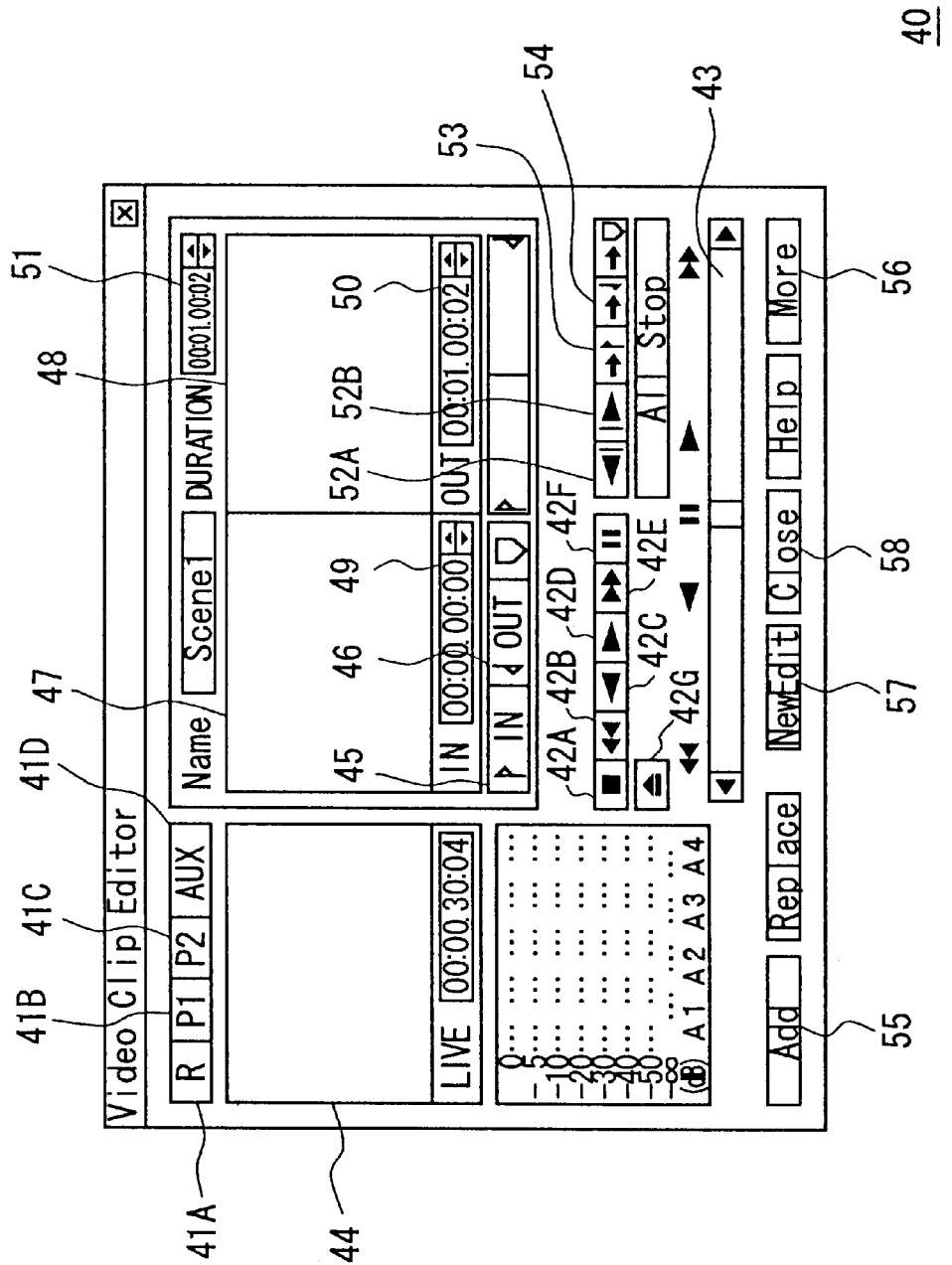
FIG. 4 is an outlined diagram showing a video clip edit window displayed on the main screen of the GUI.

Then, the operator can select a video clip edit button 31K in the upper section of this main screen 30 shown on the display 12 through mouse operation to display a window (hereafter referred to as "video clip edit window") 40 as shown in FIG. 4 on top of the main screen 30.

In this case, the video clip edit window 40 shows a plurality of source selection buttons 41A to 41D corresponding to the video cassette recorders 14A to 14D, respectively at the top left of the screen and selecting one of the source selection buttons 41A to 41D through mouse operation can select the desired one of the video cassette recorders 14A to 14D (FIG. 1).

Then, after one of the source selection buttons 41A to 41D is selected, selecting one of the video operation buttons 42A to 42G displayed in the video clip edit window 40 through mouse operation allows the selected video cassette recorder 14A to 14D to perform an operation according to the selected video operation button 42A to 42G. Such an operation of the video cassette recorder 14A to 14D can also be performed by using a slider 43.

At this time, if the video cassette recorder 14A to 14D is instructed to execute a replay operation or a replay operation at changed rate, the video reproduced from the video tape by the corresponding video cassette recorder 14A to 14D is shown in a live video display section 44 in this video clip edit window 40.

Then, the operator can click on an IN point specification button 45 or OUT point specification button 46 while confirming with the video displayed in this live video display section 44 and specify the IN point and OUT point of the video to be registered as a clip, and the images at the IN point and OUT point specified at this time are displayed in an IN point image display section 47 and OUT point image display section 48, respectively.

At this time, time codes on the video tape of the images specified as the IN point and OUT point are displayed in an IN point time code display section 49 and OUT point time code display section 50, respectively and the material length (duration) of the specified clip is displayed in a duration display section 51.

With this video clip edit window 40, it is possible to send frames of the video displayed in the live video display section 44 forward or backward by clicking on frame feed buttons 51 and 52 through mouse operation and it is further possible to move the image displayed in the live video display section 44 to the IN point or OUT point by selecting the live video move buttons 53 and 54.

Figure 5:
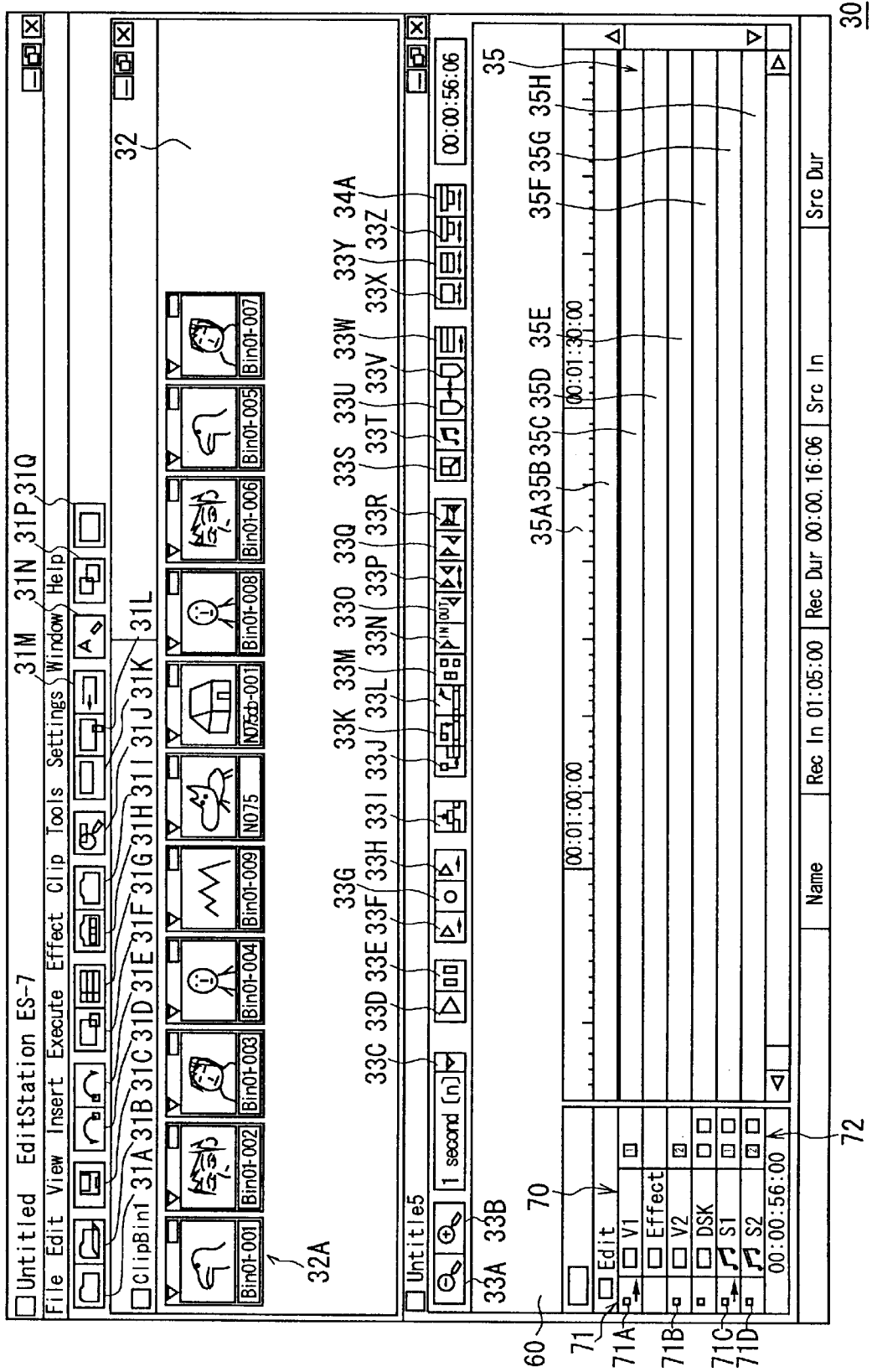
FIG. 5 is another outlined diagram showing the main screen of the GUI.

Then, as described above, after the IN point and OUT point of the clip are specified, clicking on an Add button 55 through mouse operation allows this clip to be registered. In reality, related data such as the time codes of the IN point and OUT point of this clip is captured into the RAM 22 by the CPU 20. The stamp images, time codes and material length of the clip registered in this way are displayed in a clip display section 32 in the main screen 30 as shown in FIG. 5.

At this time, for example, selecting a capture mode beforehand on a setting screen, which is not shown in the figure but can be opened by selecting a More button 56 in the video clip edit window 40 will allow the video/voice of this clip to be captured into the hard disk apparatus 2 as described above. In this case, the video signal and the voice signal of this clip is captured into the hard disk apparatus 2 with a certain extra period (e.g., 2 seconds) before and after the specified range.

Furthermore, at this time, for example, it is also possible to link or not to link the video and voice and capture them into the hard disk apparatus 2 by selecting either a link mode or unlink mode beforehand on the aforementioned setting screen.

After this, it is possible to return this video clip edit window 40 to the initial condition by clicking on a New Edit button 57 through mouse operation. This allows the operator to register other clips sequentially hereafter using the same procedure as that described above.

Furthermore, with this video clip edit window 40, it is possible to close the video clip edit window 40 by clicking on a Close button 58 through mouse operation.

On the other hand, when a list of registered clips is displayed in the clip list display section 32 of the main screen 30 as described above (FIG. 5), the operator can create an editing list using the editing list creation section 35 of this main screen 30 according to the following method.

(4) Creation of Editing List

When a plurality of clips are registered in the clip list display section 32 of the main screen 30 as described above (FIG. 5), the operator creates an editing list, which is the edit data to execute editing in the editing list creation section 35 called a "time line window" in the main screen 30 before actually executing the editing work. That is, the operator can click on one of source selection buttons 71A to 71D corresponding to a plurality of time line tracks shown in a source selection display section 71 (first video track 35C, second video track 35E, first audio track 35G and second audio track 35H) to specify a directly editable time line track onto which a clip can be pasted when creating the editing list.

In this case, if, for example, the operator selects the source selection buttons 71A and 71C corresponding to the first video track 35C and the first audio track 35G through mouse operation, the GUI displays arrows at the source selection buttons 71A and 71C of the source selection display section 71, thereby indicating to the operator that the first video track 35C and the first audio track 35G have been selected as the directly editable tracks.

By the way, the editing list creation section 35 can set beforehand tracks that can be paired at the time of creating the editing list through a group track selection display section 72. In this case, when the operator clicks on the two desired selection buttons from among the track selection buttons displayed in the group track selection display section 72 through mouse operation, the GUI sets the two clicked tracks as a pair.

Therefore, as shown in FIG. 5, if, for example, the first video track 35C and the first audio track 35G are set as a pair, the GUI marks "1" on the corresponding selection buttons of the group track selection display section 72 indicating that they belong to a first group. Then, if the operator selects one of these grouped tracks (e.g., the first video track 35C) in the source selection display section 71, the GUI also selects the other track of the pair (e.g., the first audio track 35G) as the track on which the clip is to be pasted.

In this way, when the source selection display section 71 has selected tracks on which the clip is to be pasted, the operator pastes the clip on the selected tracks. That is, the operator puts the cursor on the stamp image of the desired clip in the clip display section 32 through mouse operation and then specifies the one clip by pressing the button of the mouse 13 and while holding down the button of the mouse 13, the operator moves the cursor to the desired position of the first video track 35C using the time line scale 35A of the editing list creation section 35 as an index and then releases the button of the mouse 13.

Figure 6:
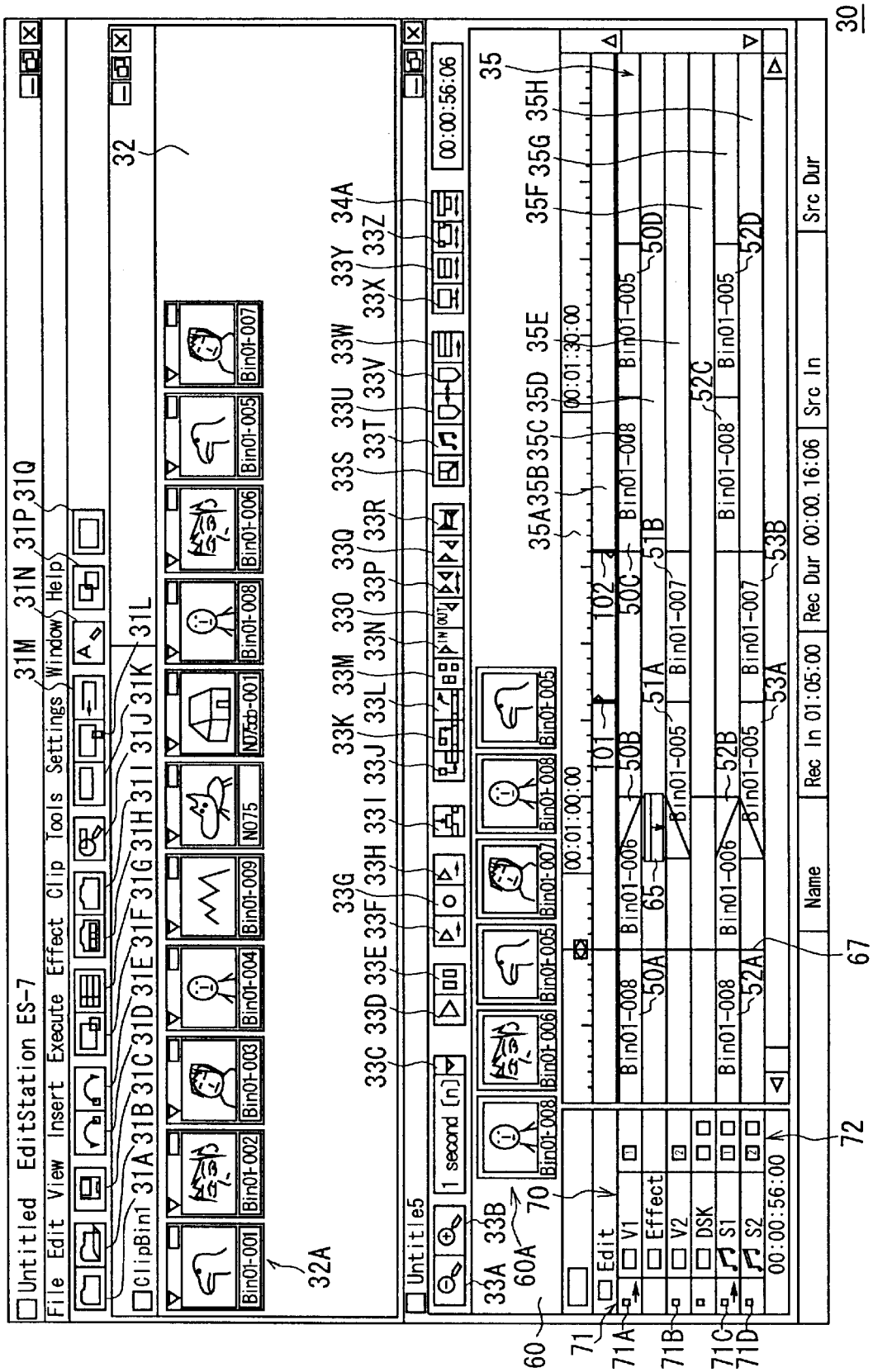
FIG. 6 is a further outlined diagram showing the main screen of the GUI.

In this case, since the first video track is set beforehand through the operation of the operator as the track on which the clip is to be pasted, the GUI displays, as shown in FIG. 6, so that a frame 50A (FIG. 6) of a length corresponding to the length of the clip that the operator selected through operation of the mouse 13 is pasted onto the first video track 35C together with the number indicating the clip (e.g., "Bin01-008").

Moreover, since the first audio track 35G is set beforehand through the operation of the operator as the track on which the clip is to be pasted, the GUI pastes the clip onto the first audio track 35G according to the pasting of the clip onto the first video track 35C. In this way, a frame 52A of the same length as the clip pasted on the first video track 35C is displayed on the first audio track 35G together with the number indicating the clip (e.g., "Bin01-008").

As shown above, when the operator pastes the frames 50A and 52A indicating the clip that the operator specified through operation of the mouse 13 onto the time lines of the editing list creation section 35, the GUI displays a stamp image 60A indicating the clip corresponding to the clip pasted on the time line track in a clip image display section 60 provided at the top of the corresponding time line track.

In this way, the operator can easily check the contents of the clip pasted on the time line track by looking at the corresponding stamp image.

Likewise, the GUI pastes frames indicating the clips that the operator specified through operation of the mouse 13 (50A to 50D, 51A and 51B, 52A to 52C, and 53A and 53B) on time line tracks (first video track 35C, second video track 35E, first audio track 35G and second audio track 35H) according to the mouse operation by the operator.

By the way, a special effect track 35D provided as one of the time line tracks is a track to specify various special effects on the clips pasted on the first video track 35C and the second video track 35E. For example, a special effect display 65 shown in FIG. 6 is supposed to specify that the screen should move gradually from a clip 50B pasted on the first video track 35C to the clip 51A pasted on the second video track 35E.

In this way, with clips and special effects specified for the editing list creation section 35 (FIG. 6), the operator can perform various kinds of editing such as insertion or deletion of a desired clip through operation of the mouse 13 on the once created editing list of the editing list creation section 35.

In this case, the operator can select a plurality of tracks in which the effect of the editing work is reflected from among a plurality of tracks displayed in the track display section 70 through operation of the mouse 13. That is, if the operator, for example, clicks on the display field of a track display section 70 corresponding to the first video track 35C and the second video track 35E through operation of the mouse 13, the GUI changes the color of the clicked display field to a blue color, which is the dedicated color of a video track and at the same time changes the color of the first video track 35C and the second video track 35E corresponding to the display field to a blue color. Then, the GUI changes the pasting positions of the clips that the operator pasted on the first video track 35C and the second video track 35E during the editing work accordingly.

Regarding audio tracks, if the operator, for example, clicks the display field of the track display section 70 corresponding to the first audio track 35G and the second audio track 35H through operation of the mouse 13 likewise, the GUI changes the color of the clicked display field to a yellow color which is a color dedicated to an audio track and at the same time changes the color of the first audio track 35G and the second audio track 35H corresponding to the display field to a yellow color. Then, under this condition, the GUI changes the pasting positions of the clips pasted in the first and second audio tracks 35G and 35H when the operator performed the editing work accordingly. By the way, if one of the first and second audio tracks 35G and 35H is paired with one of the video track 35C or 35E in the group track selection display section 72, the same clip will be inserted or deleted according to pasting of the clip on or deletion of the clip from the video track that forms the corresponding pair.

Therefore, in a state as shown in FIG. 6 if, for example, a desired clip is pasted on the first video track 35C, the same clip is also pasted at the same position of the first audio track 35G that forms a pair with the corresponding video track 35C.

At this time, if another clip is already pasted in the first video track 35C, the second video track 35E, the first audio track 35G and the second audio track 35H, and if, of a plurality of tracks displayed in the track display section 70, the first and second video tracks 35C and 35E and the first and second audio tracks 35G and 35H are selected as the tracks to reflect the editing effects, the GUI moves the respective clips of the first and second video tracks 35C and 35E and the first and second audio tracks 35G and 35H in accordance with pasting of the clips to the first video track 35C and the first audio track 35G.

Figure 7:
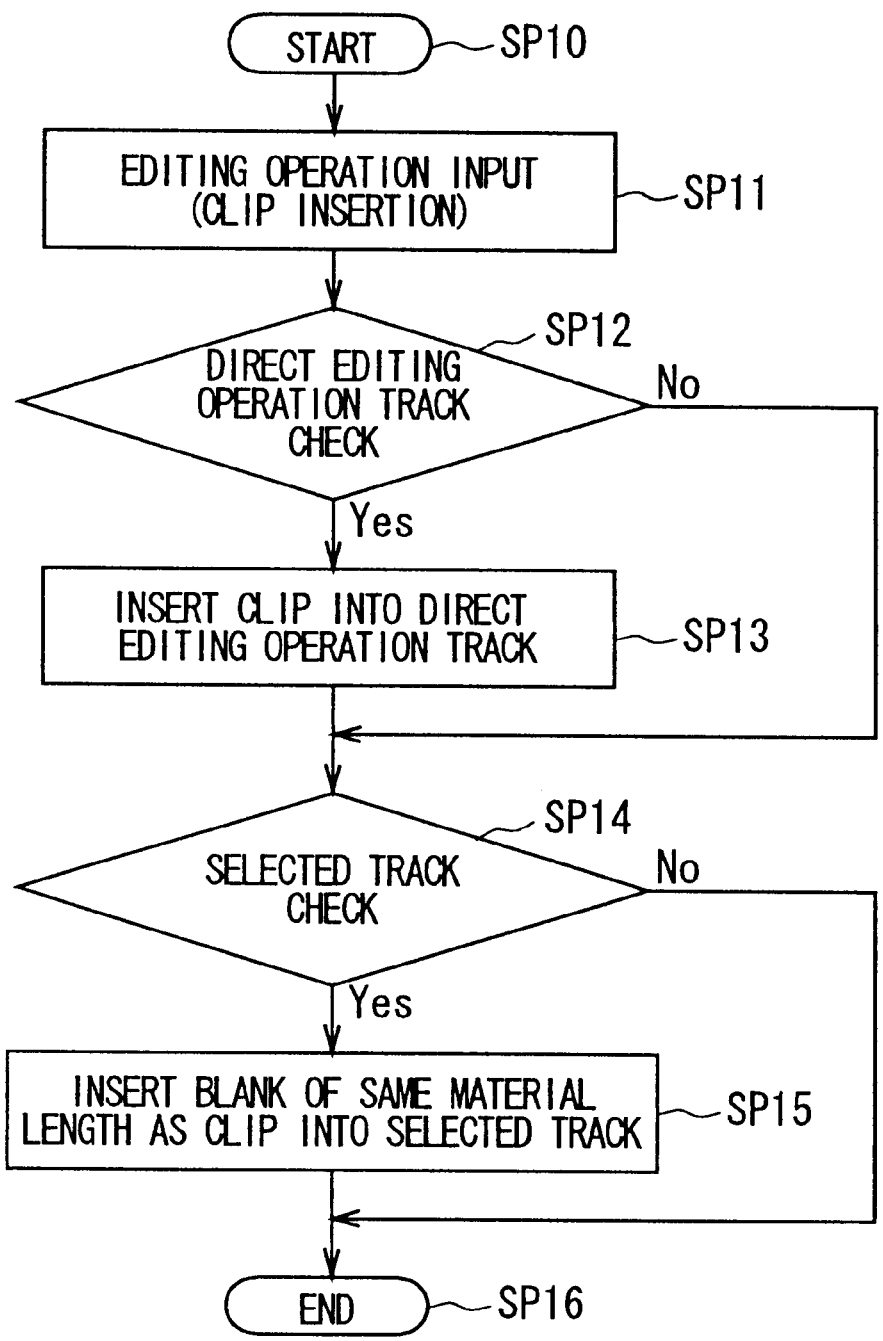
FIG. 7 is a flow chart showing a clip insertion procedure.

Here, FIG. 7 shows the editing procedure to insert clips. The GUI registers a plurality of clips in the clip display section 32 of the main screen 30 through operation of the operator and at the same time starts the editing procedure from step SP10 with a plurality of clips already pasted as shown in FIG. 6 and waits for a command to insert clips through mouse operation by the operator in the next step SP11.

When the operator selects a desired clip from among the registered clips and pastes it on the time line track through operation of the mouse 13, the GUI moves to step SP12 and determines whether or not the operated time line track is set as the directly editable track by the source selection display section 71.

Here, if a positive result is obtained, this means that the time line track on which the operator is supposed to paste the clip is set as a directly editable track and at this time the GUI moves to step SP13 and pastes the clip specified by the operator on the time line track according to the operation by the operator. At this time, the GUI inserts the new clip by moving forward the clips already existing at and after the position on the time line at which the new clip is pasted by the length of the newly pasted clip and then moves to the next step SP14.

On the other hand, if a negative result is obtained in step SP12, this means that the time line track on which the new clip is supposed to be pasted is not selected as a directly editable track by the source selection display section 71, and at this time the GUI does not insert the new clip into the track specified by the operator as the insertion track but moves to step SP14 and determines whether the selected track is set or not.

Here, if a positive result is obtained, this means that the operator has set the selected track to be reflected in the editing of the directly editable track, and at this time the GUI moves to step SP15 and inserts a blank of the same length as that of the insertion clip that is supposed to be pasted to the directly editable track into the track set as the selection track and ends the processing in step SP16.

Furthermore, in step SP14, if a negative result is obtained, this means that the selected track that would be reflected in the editing work of the directly editable track is not set beforehand, and at this time the GUI moves to step SP16 and ends the procedure.

In this way, according to the clip insertion procedure in FIG. 7, by previously presetting a directly editable track and selected track, if the operator inserts a desired clip into the directly editable track, the clip in the selected track also moves accordingly, and in this way the correlation between the clip in the directly editable track and the clip in the selected track is maintained.

Figure 8:
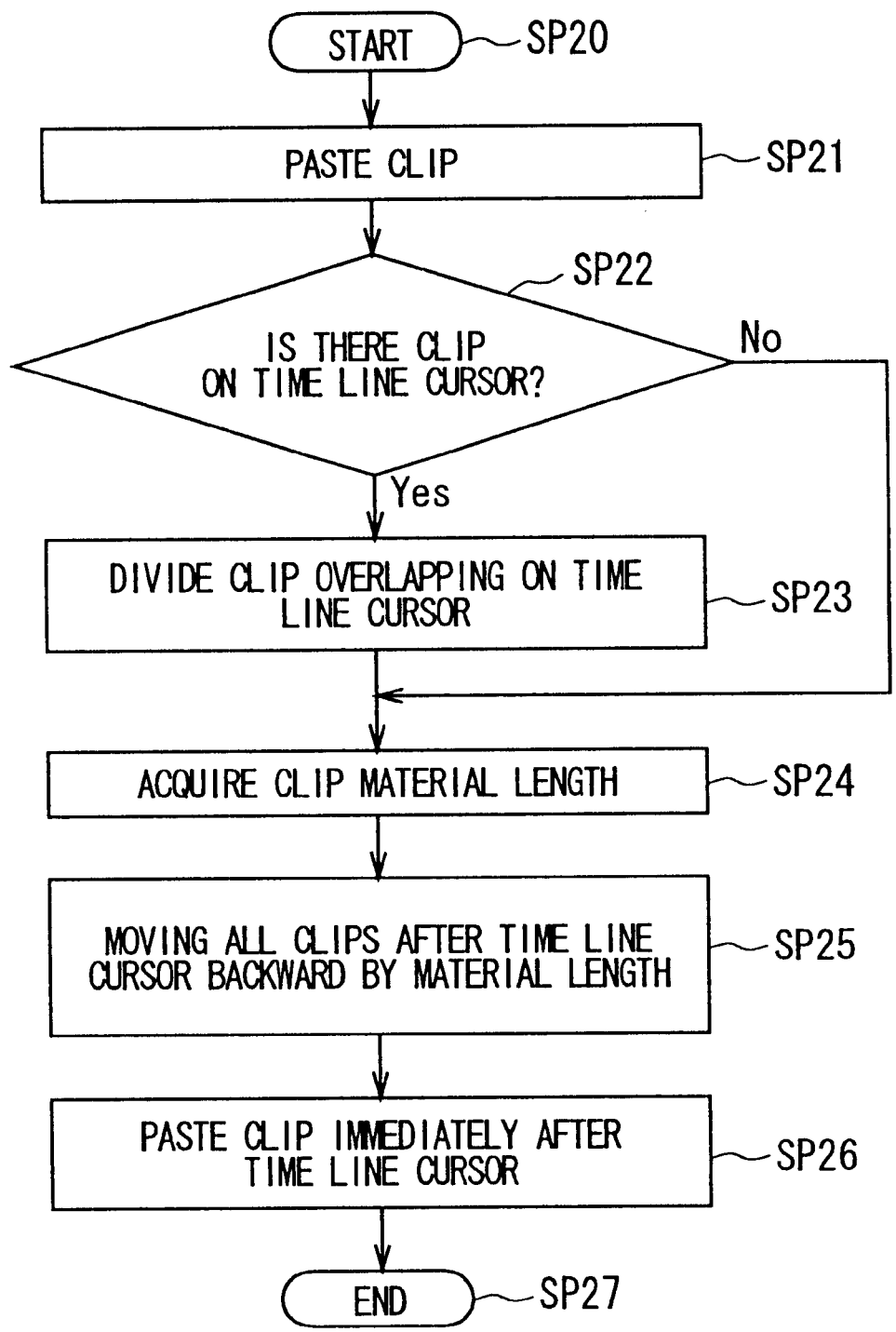
FIG. 8 is another flow chart showing the clip insertion procedure.

On the contrary, in the editing list creation section 35 of the main screen, if a clip is inserted on the time line using the time line cursor 67 (FIG. 6) movable back and forth on the time line track by the operator, the GUI executes the clip insertion procedure shown in FIG. 8.

That is, the GUI registers a plurality of clips in the clip display section 32 of the main screen 30 through operation by the operator and when the operator selects a desired clip from among the registered clips using the mouse 13 with a plurality of clips already pasted as shown in FIG. 6 and clicks on a clip pasting button 33J provided on the editing list creation section 35, the GUI starts the editing procedure from step SP20 in FIG. 8 and starts pasting the clip using the time line cursor 67 in the next step SP21.

Then, in step SP22, the GUI determines whether or not another clip already exits on the time line cursor 67 in the clip pasting track (e.g., the first video track 35C in FIG. 6) selected as the directly editable track in the source selection display section 71. Here, if a positive result is obtained, this means that the place specified as the clip insertion position by the time line cursor 67 is a part of the clip already pasted. At this time, the GUI moves to step SP23, splits the clip that overlaps the time line cursor 67 at the position of the time line cursor 67 and moves to step SP24.

On the contrary, if a negative result is obtained in step SP22, this means that the time line cursor 67 does not overlap the existing clip on the directly editable track (the first video track 35C) and at this time the GUI moves to step SP24.

In step SP24, the GUI reads the material length of the clip to be pasted on the directly editable track (the first video track 35C) from the RAM 22 (FIG. 2) of the computer 3 (FIG. 1) at this time and moves backward all clips at and after the time line cursor 67 by the material length in the next step SP25.

Then, the GUI moves to step SP26, pastes the clip to be pasted in the blank immediately after the time line cursor 67 formed in step SP25 and ends the clip insertion procedure in the next step SP27.

Figure 9:
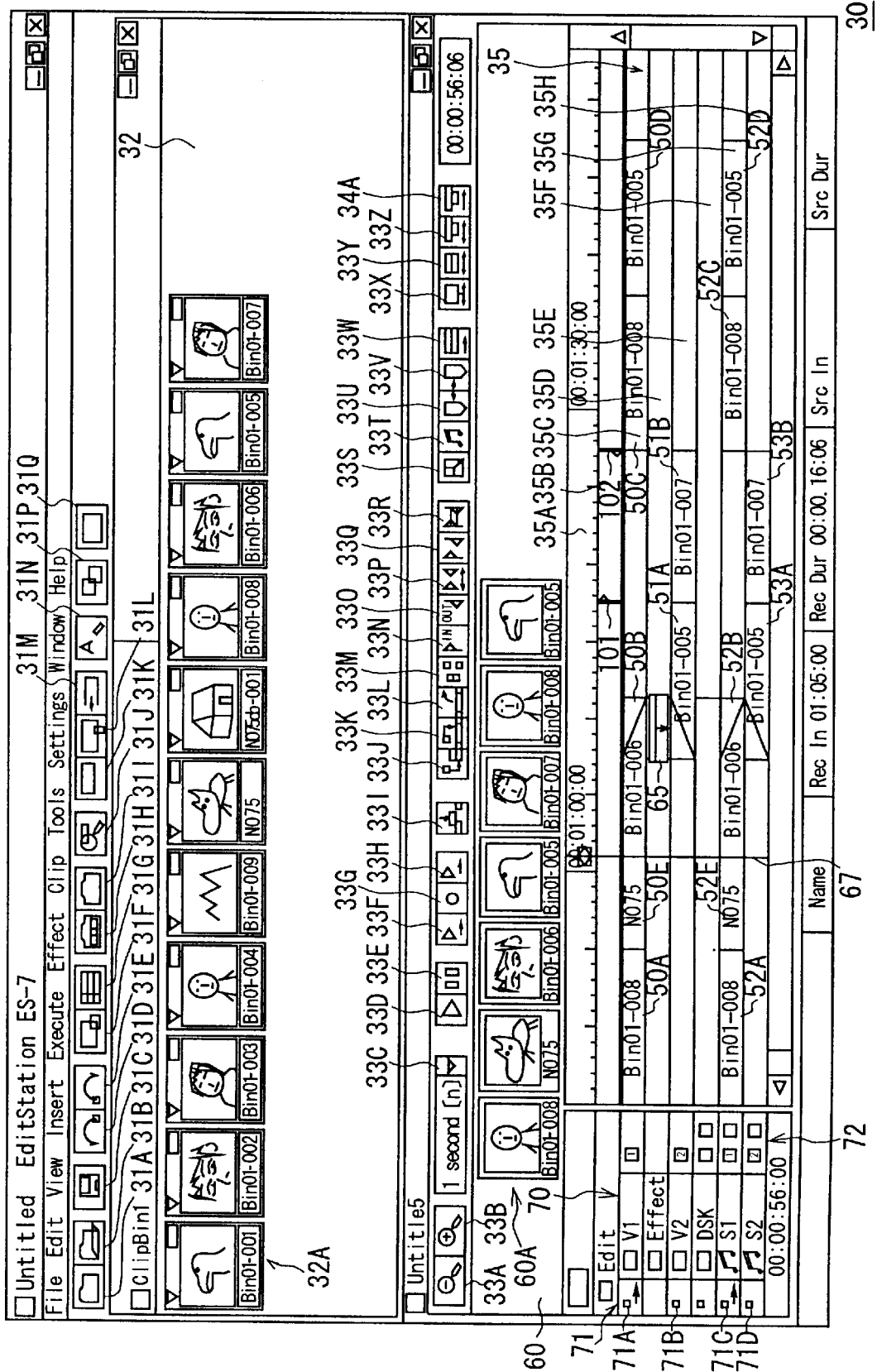
FIG. 9 is a still further outlined diagram showing the main screen of the GUI.

In this way, in the editing list creation section 35 shown in FIG. 6, if a new clip is inserted at the position of the time line cursor 67 of the first video track 35C by the procedure shown in FIG. 8, a new frame 50E indicating the new clip is inserted as shown in FIG. 9 and the frames 50B, 50C and 50D indicating the clips that existed at and after the position of the time line cursor 67 before the insertion move backward by the length of the frame 50E of the new clip. As a result, the correlation between the clips including and after the clip newly inserted on the first video track 35C is maintained the same as before the insertion.

By the way, in FIG. 9, because the first audio track 35G is selected as the directly editable track in accordance with the first video track 35C, the similar insertion procedure is also carried out on the first audio track 35G in response to the insertion of the new clip into the first video track 35C and the new clip frame 52E is inserted.

Furthermore, in FIG. 9, because the second video track 35E and the second audio track 35H are set in such a way as to reflect the editing results of the first video track 35C and the first audio track 35G, the clips at and after the position of the time line cursor 67 of the second video track 35E and the second audio track 35H are also moved backward by the length of the new clip inserted into the first video track 35C and the first audio track 35G, and in this way, the correlation between the clips including and after the newly inserted clip in the first and second video tracks 35C and 35E and the first and second audio tracks 35G and 35H is maintained.

Figure 10:
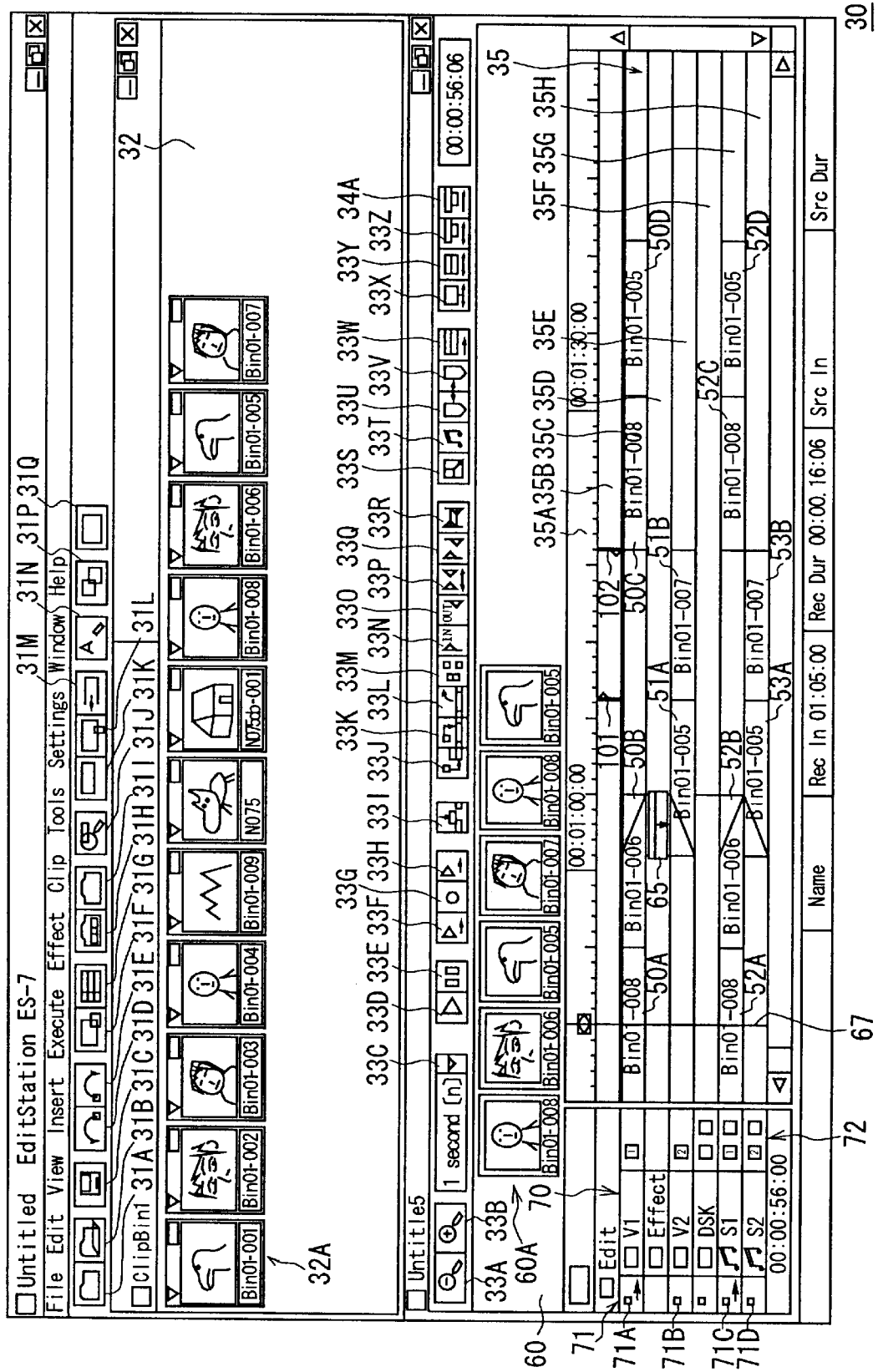
FIG. 10 is a still further outlined diagram showing the main screen of the GUI.
Figure 11:
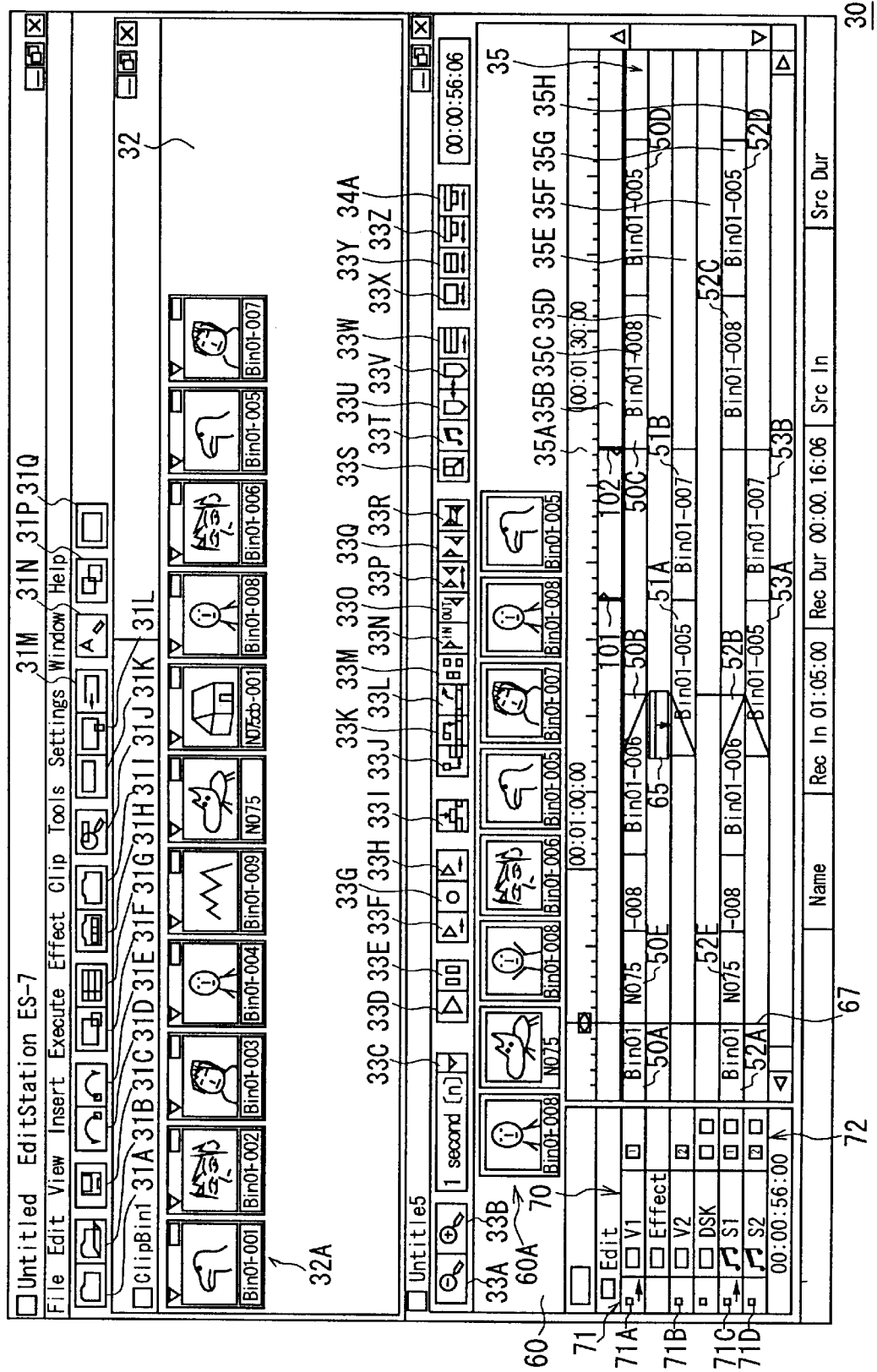
FIG. 11 is a still further outlined diagram showing the main screen of the GUI.

By the way, if the time cursor 67 as shown in FIG. 10 overlaps the existing clip frames 50A and 52A, according to the aforementioned insertion procedure in FIG. 8, the frames 50A and 52A are separated at the position of the time line cursor 67 as shown in FIG. 11, and the new clip frames 50E and 52E are inserted at the separation positions. In this case, the clips including and after the inserted clip are also moved backward by the length of insertion.

Then, the case where the operator deletes an existing clip on the time line track in the editing list creation section 35 of the main screen is explained. In this case, the GUI executes a clip deletion procedure shown in FIG. 12.

Figure 12:
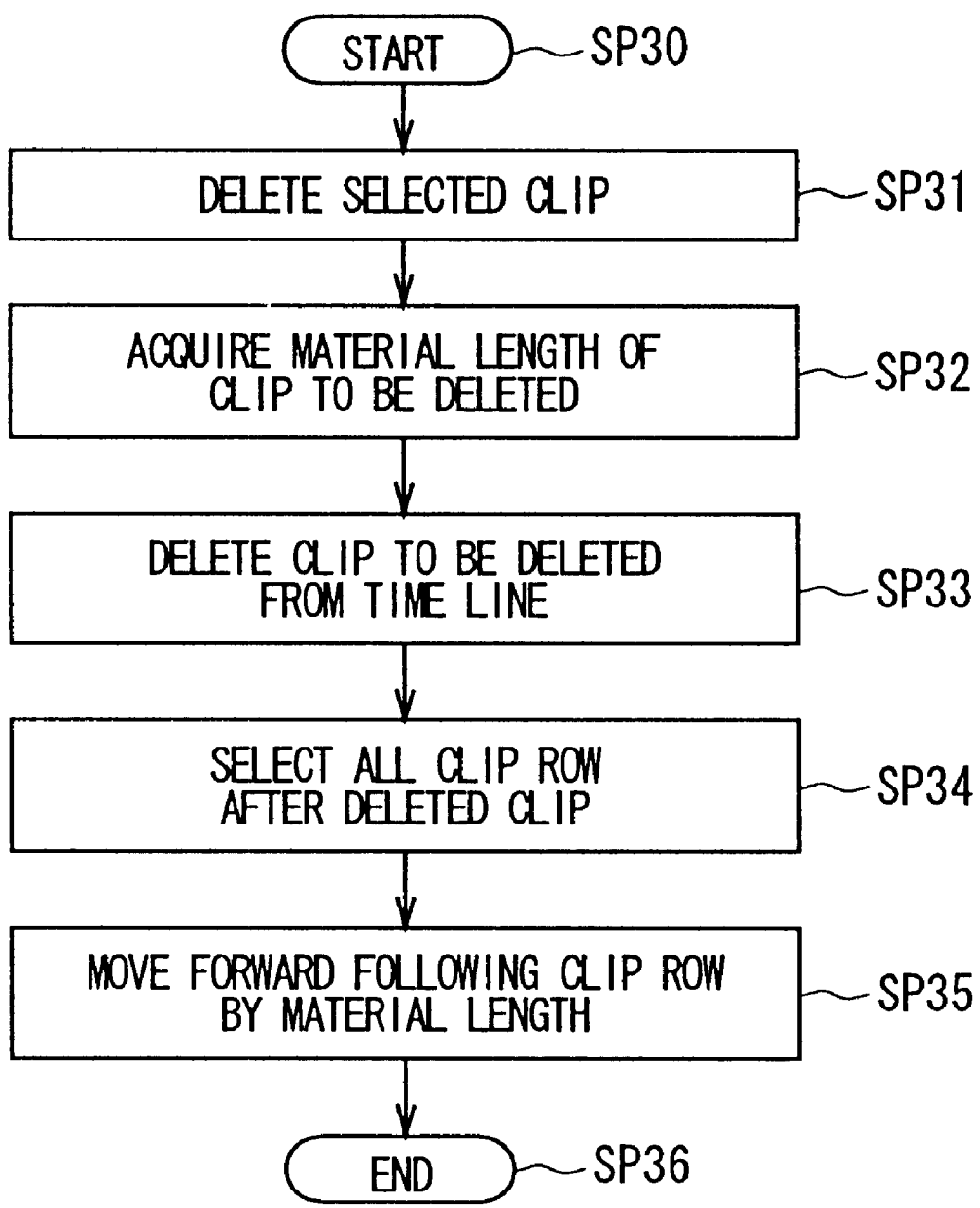
FIG. 12 is a flow chart showing a clip deletion procedure.

That is, with a plurality of clips pasted in the editing list creation section 35 of the main screen 30 shown in FIG. 6, if the operator selects a desired clip using the mouse 13 and clicks on the delete button 33L provided at the top of the editing list creation section 35, the GUI enters the editing procedure from step SP30 in FIG. 12 and starts the clip deletion processing in the next step SP31.

Then, in step SP32, the GUI reads the material length of the clip to be deleted specified at this time from the RAM 22 of the computer 3 and then deletes the clip be deleted from the time line track in the next step SP33.

When the specified clip frame is deleted from the time line track, the GUI moves to step SP34 and selects all clips including and after the deleted clip as the clips to be moved. At this time, if the selected track in which the editing result is reflected is specified, the GUI also selects all clips that exist at and after the position of the deleted clip in the selection track as the clips to be moved.

Then, the GUI moves to step SP35, moves forward all the clips to be moved which were selected in step SP34 by the material length of the deleted clip and ends the deletion procedure in the next step SP36.

Figure 13:
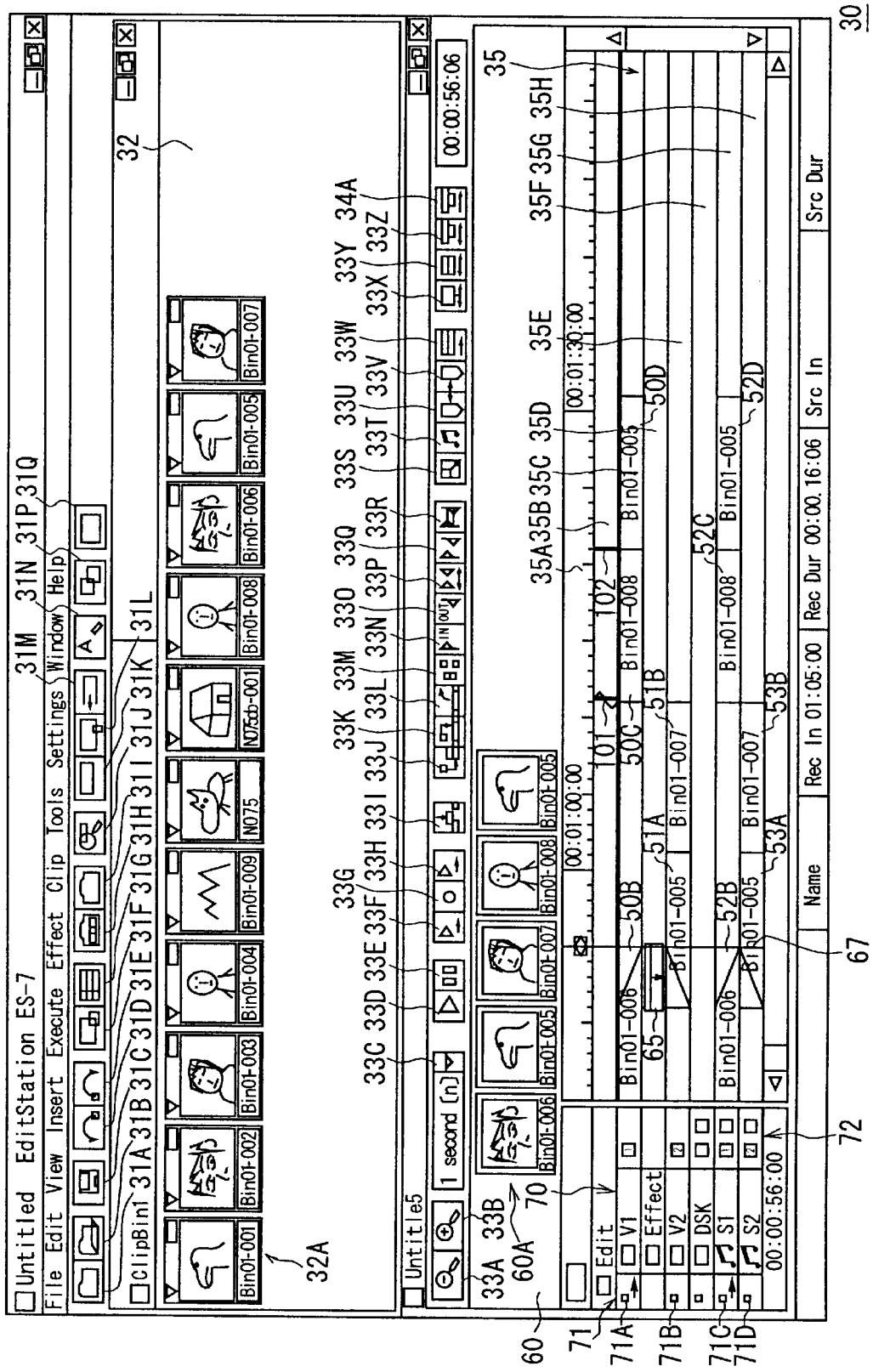
FIG. 13 is a still further outlined diagram showing the main screen of the GUI.

In this way, in the main screen shown in FIG. 6, if, for example, the first clips (50A, 52A) of the first video track 35C and the first audio track 35G which are selected as the source selection tracks are selected, the frames 50A and 52A of the relevant clips are deleted as shown in FIG. 13 and at the same time the frames 50B to 50D and 52B to 52D of the tracks following the first video track 35C and the first audio track 35G, and the frames 51A and 51B and 53A and 53B of the clips of the second video track 35E and the second audio track 35H which are specified to reflect the editing work move forward.

In this way, the clips of all time line tracks specified to reflect the editing results maintain the correlation between them.

Here, in the editing list creation section 35 of the main screen shown in FIG. 6, the GUI edits the editing list limited to the range specified by a mark-in mark 101 and mark-out mark 102 using the mark-in mark 101 and mark-out mark 102.

Figure 14:
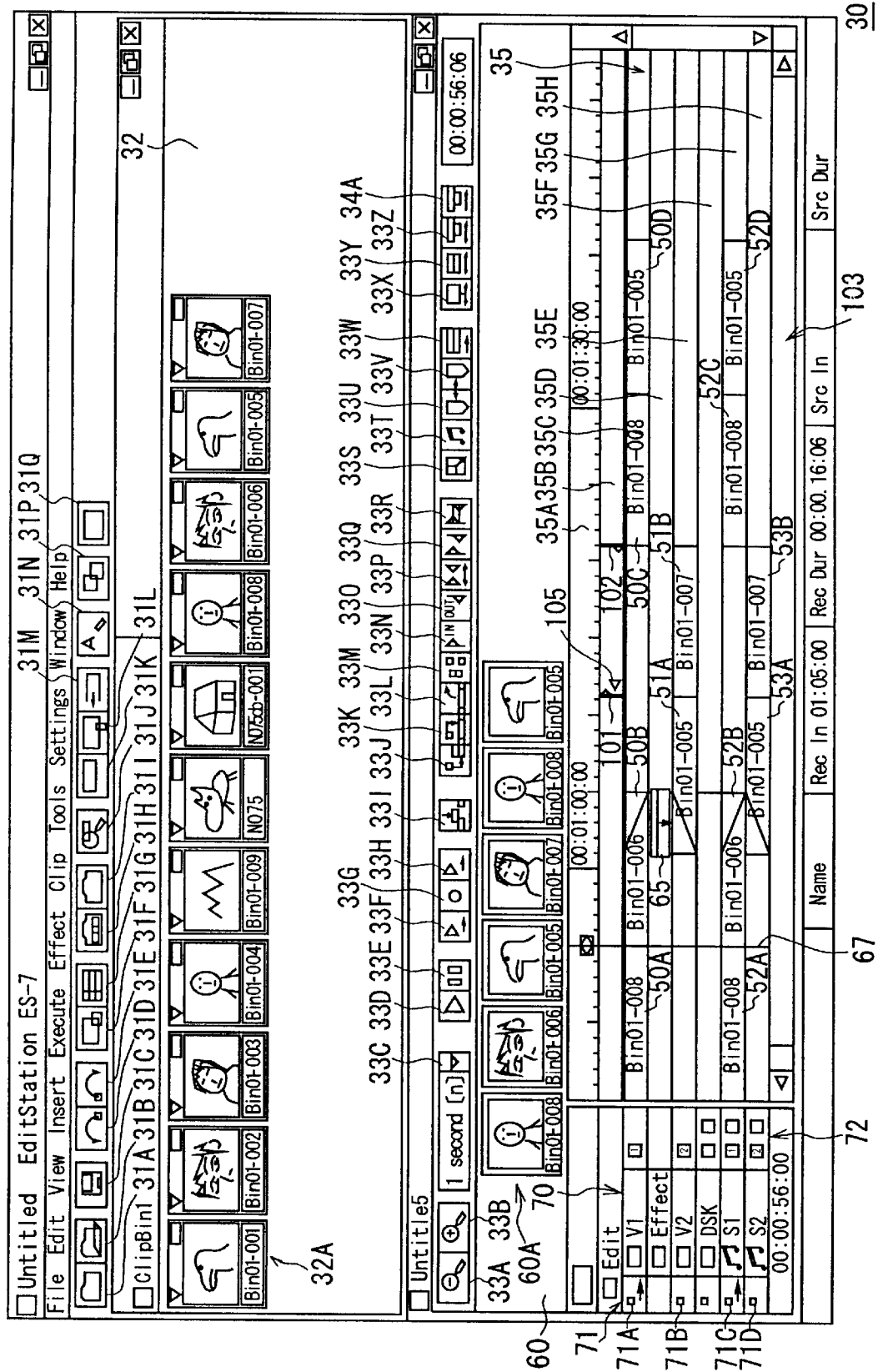
FIG. 14 is a still further outlined diagram showing the main screen of the GUI.

That is, in FIG. 14, if the operator moves the time line cursor 67 to an arbitrary position and clicks on the mark-in button 33N, the GUI sets the mark-in mark 101 at the position of the time line cursor 67. If the operator moves the time line cursor 67 to an arbitrary position and clicks on the mark-in button 33O, the GUI sets the mark-out mark 102 at the position of the time line cursor 67.

Furthermore, when the operator moves the cursor to any clip on the time line track and clicks on the mark clip button 33P, the GUI sets the mark-in mark 101 and mark-out mark 102 at the In point and OUT point of the clip.

These mark-in mark 101 and mark-out mark 102 can be set on the time line only one each, and in this way editing operations can be performed using mark-in mark 101 and mark-out mark 102 which can be set only on the time line track.

These mark-in mark 101 and mark-out mark 102 can be erased by clicking on the clear mark button 33R. If the operator puts the cursor of the mouse 13 on either one of the mark-in mark 101 or mark-out mark 102 and moves the cursor while holding down the mouse button, the mark-in mark 101 or mark-out mark 102 moves as the mouse cursor moves. Moreover, when both mark-in mark 101 and mark-out-mark 102 are set, if the operator puts the mouse cursor on one of them and moves it while holding down the mouse button, the mark-in mark 101 and mark-out-mark 102 move on the time scale as the mouse cursor moves while keeping their distance constant.

The GUI displays the time code information and distance between the marks of the mark-in mark 101 and mark-out-mark 102 set in this way on a status bar 103 at the bottom of the time line track.

Figure 15:
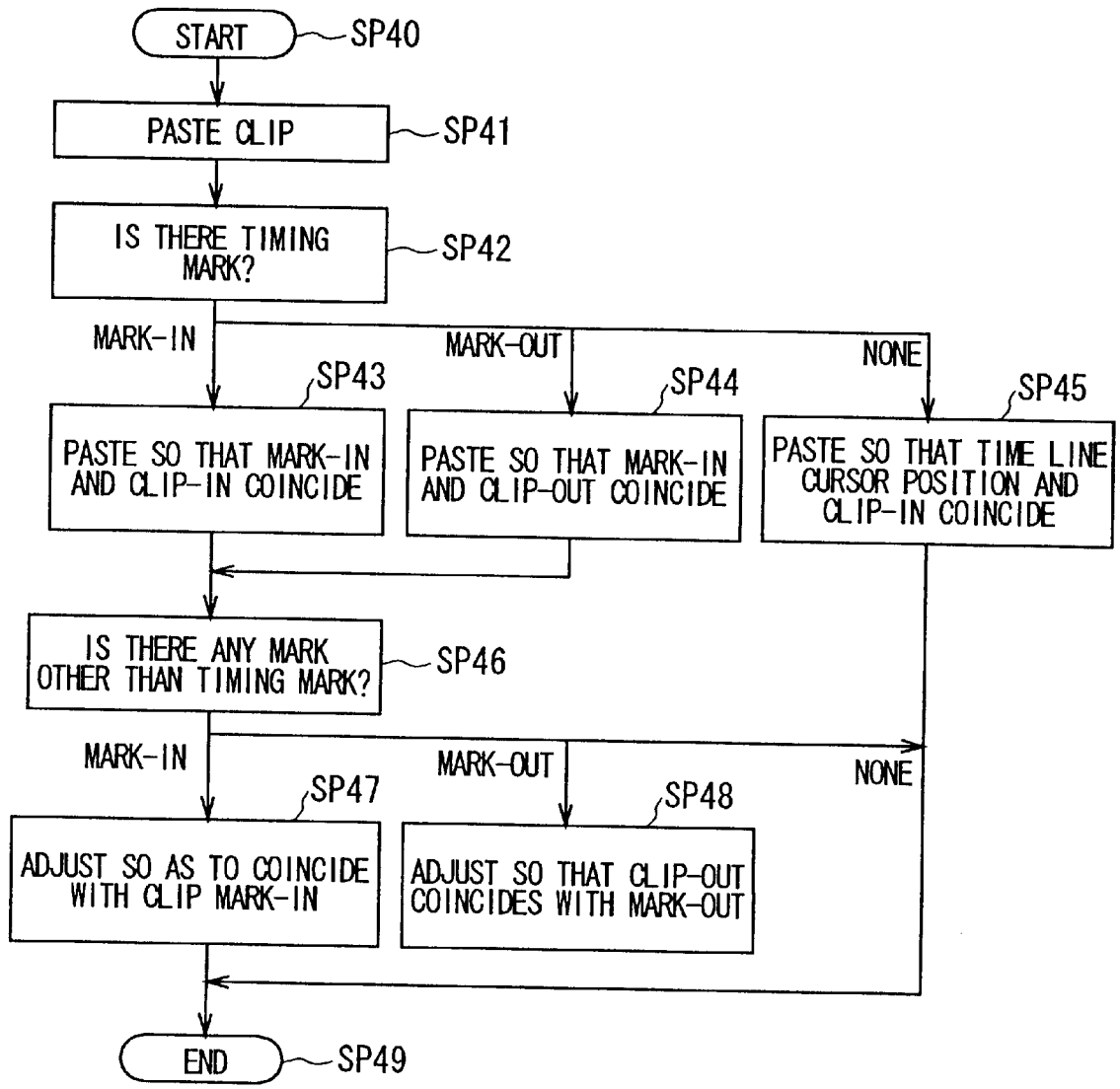
FIG. 15 is another flow chart showing the clip insertion procedure.

Here, FIG. 15 shows the editing procedure using the mark-in mark 101 and mark-out-mark 102. That is, in the main screen 30 shown in FIG. 14, if the operator operates the mouse 13 to select one of the clips registered in the clip display section 32 and specifies this to be pasted in the editing list creation section 35, then the GUI enters the editing procedure from step SP40 shown in FIG. 15 and at the same time starts the clip pasting processing in the next step SP41.

Then, the GUI moves to step SP42 and determines whether any timing mark exists in the editing list creation section 35 or not. Here, when both the mark-in mark 101 and mark-out mark 102 are set, the timing mark refers to a mark indicating the priority which will be set in either one of the mark-in mark 101 and mark-out-mark 102. For example, if the operator double clicks on the mark-in button 33N, the GUI displays the timing mark 105 together with the mark-in mark 101 as shown in FIG. 14. By the way, if only one of the mark-in mark 101 or mark-out mark 102 is set, the GUI regards the relevant set mark-in mark 101 or mark-out-mark 102 as the timing mark 105.

In this way, if the timing mark 105 is set in the mark-in mark 101, the GUI moves from step SP42 to step SP43 in FIG. 15 and pastes the clip in such a way that the time position of the mark-in mark 101 marked with the timing mark 105 coincides with the time position of the IN point of the clip to be pasted on the time line track at this time.

On the contrary, if the timing mark 105 is set in the mark-out mark 102, the GUI moves from step SP42 to step SP44 in FIG. 15 and pastes the clip in such a way that the time position of the mark-out mark 102 marked with the timing mark 105 coincides with the time position of the OUT point of the clip to be pasted on the time line track at this time.

On the other hand, if the timing mark 105 is not set, the GUI moves to step SP45, pastes the clip so that the position of the time line cursor 67 coincides with the time position of the IN point of the clip to be pasted on the time line track at this time, and then ends the procedure in step SP49.

In step SP43 or step SP44, if the clip is pasted on the time line track in such a way that its IN point or OUT point coincides with the timing mark 105, the GUI moves to the step SP46 and determines whether any mark other than the timing mark 105 (that is, the mark-in mark 101 or mark-out mark 102 which does not have the timing mark 105) exists or not in the editing list creation section 35.

Here, if the mark-in mark 101 without any timing mark 105 exists, the GUI moves from step SP44 to step SP47 via step SP46. In this case, the timing mark 105 is set in the mark-out mark 102, and in step SP44, the relevant clip is pasted on the time line track so that the OUT point of the clip coincides with the time position of the mark-out mark 102, and at the same time the length of the relevant clip is adjusted so that the IN point of the clip coincides with the time position of the mark-in mark 101 in step SP47. In this way, the clip is inserted between the mark-out mark 102 marked with the timing mark 105 and the mark-in mark 101 without the timing mark 105.

On the contrary, if the mark-out mark 102 without any timing mark 105 exists, the GUI moves from step SP43 to step SP48 via step SP46. In this case, the timing mark 105 is set in the mark-in mark 101 and in-step SP43, the relevant clip is pasted on the time line track so that the IN point of the clip coincides with the time position of the relevant mark-in mark 101 and in step SP48, the length of the relevant clip is adjusted so that the OUT point of the clip coincides with the time position of the mark-out mark 102. In this way, the clip is inserted between the mark-in mark 101 marked with the timing mark 105 and the mark-out mark 102 without the timing mark 105.

Furthermore, in step SP46, if there is none of the marks marked with the timing mark 105, the GUI moves to step SP49 and ends this procedure.

In this way, according to the clip insertion procedure shown in FIG. 15, when both the mark-in mark 101 and mark-out mark 102 are set, if the timing mark 105 is set in the mark-in mark 101, the GUI adjusts the IN point of the clip to be inserted with the time position of the mark-in mark 101 and at the same time adjusts the length of the relevant clip so that its OUT point coincides with the mark-out mark 102, making it possible to correctly insert the clip between the mark-in mark 101 and mark-out mark 102.

Furthermore, when both the mark-in mark 101 and mark-out mark 102 are set, if the timing mark 105 is set in the mark-out mark 102, the GUI adjusts the OUT point of the clip to be inserted with the time position of the mark-out mark 102 and at the same time adjusts the length of the relevant clip so that its IN point coincides with the mark-in mark 101, making it possible to correctly insert the clip between the mark-in mark 101 and mark-out mark 102.

By the way, even when both the mark-in mark 101 and mark-out mark 102 are set and the timing mark 105 is set in the mark-in mark 101, if the time position of the mark-out mark 102 exists ahead of the time position of the mark-in mark 101, the GUI inserts the relevant clip into the time line track in such a way that the IN point of the clip to be inserted coincides with the mark-in mark 101. In this case, the length of the clip to be inserted is maintained to the length already registered in the clip display section 32.

Furthermore, even when both the mark-in mark 101 and mark-out mark 102 are set and the timing mark 105 is set in the mark-out mark 102, if the time position of the mark-out mark 102 exists ahead of the time position of the mark-in mark 101, the GUI inserts the relevant clip into the time line track in such a way that the OUT point of the clip to be inserted coincides with the mark-out mark 102. In this case, the length of the clip to be inserted is maintained to the length already registered in the clip display section 32.

On the contrary, if only the mark-in mark 101 is set, the GUI pastes the relevant clip on the time line track in such a way that the IN point of the clip to be inserted into the time position of the set mark-in mark 101 coincides. In this case, the length of the clip to be inserted is maintained to the length already registered in the clip display section 32.

Furthermore, if only the mark-out mark 102 is set, the GUI pastes the relevant clip on the time line track in such a way that the OUT point of the clip to be inserted coincides with the time position of the set mark-out mark 102. In this case, the length of the clip to be inserted is maintained to the length already registered in the clip display section 32.

Furthermore, when the time position of the mark-out mark 102 is behind the time position of the mark-in mark 101, if the operator clicks on the preview button 33P displayed at the top of the editing list creation section 35, the GUI can reproduce only the clip between the mark-in mark 101 and mark-out mark 102 on the monitor.

Then, if the operator clicks on the erasure button 33R, the GUI erases the mark-in mark 101 and mark-out mark 102 set in the editing list creation section 35.

Then, when a plurality of clips are already pasted in the editing list creation section 35, the process of adjusting the length of the clip (trimming adjustment processing) is explained.

The operator can adjust the length of the IN point and OUT point of the relevant clip by double-clicking on the IN point or OUT point of the clip subject to trimming adjustment of the first video track 35C specified as the directly editable track of the editing list creation section 35 of the main screen described in FIG. 6 using the mouse cursor.

Figure 16:
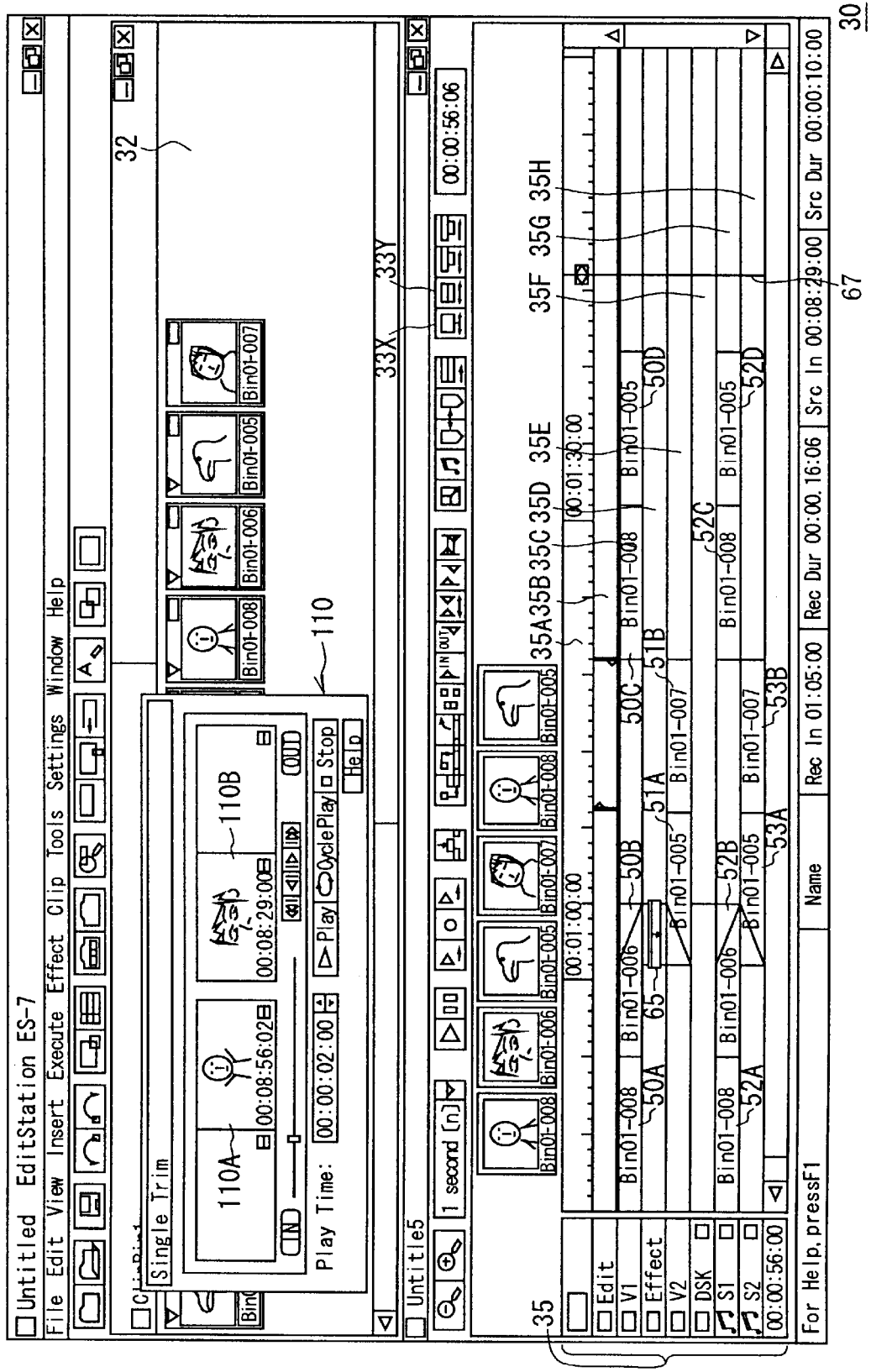
FIG. 16 is a still further outlined diagram showing the main screen of the GUI.

For example, if the operator attempts to perform trimming adjustment of the OUT point of the first clip of the first video track, the operator double-clicks slightly inside the OUT point of the frame 50A of the relevant clip, thereby the GUI executes trimming adjustment at the OUT point of the relevant clip. In this case, trim dialog window 110 is displayed on the main screen as shown in FIG. 16.

This trim dialog window 110 shows a stamp image of the trimming adjustment point of the clip subject to trimming adjustment and a stamp image of the adjacent clip. For example, in FIG. 16, the stamp image 110A at the OUT point of the clip (50A) subject to trimming adjustment and the stamp image 10B at the IN point of the second clip (50B) adjacent to the relevant OUT point are displayed.

Figure 17:
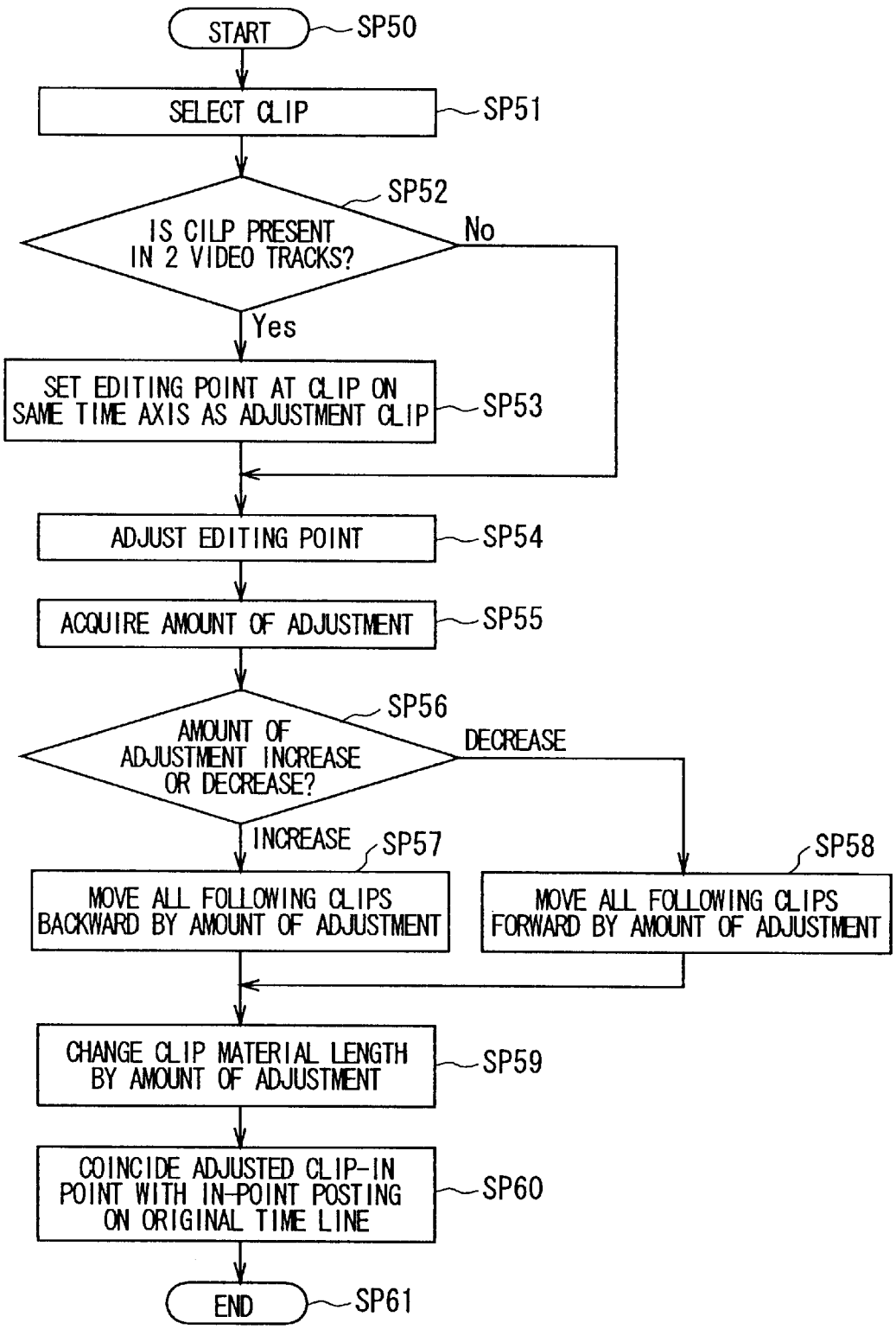
FIG. 17 is a flow chart showing a trimming adjustment procedure.

In this way, when the operator inputs a trimming adjustment command, the GUI enters the trimming adjustment procedure shown in FIG. 17 from step SP50 and starts trimming adjustment processing in step SP51.

Then, in the next step SP52, the GUI determines whether any clip exists in the second video track in addition to the first video track 35C to be trimming-adjusted and determines whether the second video track 35E is set as the track to reflect the editing work for the first video track 35C set as the directly editable track.

If a positive result is obtained here, this means that the result of trimming adjustment in the first video track 35C should also be reflected in the clip that exists in the second video track. At this time, the GUI moves to step SP53 and sets an editing point for a clip (including a blank) in the second video track 35E that exists at the same time position as the OUT point of the clip (50A) of the first video track subject to trimming adjustment and then moves to step SP54.

On the other hand, if a negative result is obtained in step SP52, this means that the trimming adjustment in the first video track 35C need not be reflected in the second video track 35E. At this time, the GUI moves to step SP54.

In step SP54, if the operator adjusts the OUT point of the first clip (50A) of the first video track 35C by moving the mouse cursor, the GUI moves the OUT point of the first clip (50A) of the first video track 35C according to the adjustment. At this time, the GUI does not change the position of the IN point of the clip (50A) to be trimming-adjusted. This makes the stamp image 110A at the OUT point of the clip (50A) subject to trimming adjustment of the trim dialog window 110 displayed on the main screen change according to the adjustment operation and display the stamp image at a time position that is always adjusted.

In this way, when the adjustment of the OUT point by the operator ends, the GUI moves to step SP55, acquires the amount of adjustment in step SP54 and then moves to step SP56. In step SP56, the GUI detects an increment/decrement of the amount of adjustment, that is a variation of the time position of the OUT point of the first clip (50A) changed by trimming adjustment.

If this detection result shows an increase (that is an advanced state on the time scale), the GUI moves to step SP57 and moves all the following clips backward by the amount corresponding to the adjustment. The "following clips" in this case refer to all the clips at and after the OUT point of the first clip (50A) of the first video track 35C if only the first video track 35C is set as the trimming adjustment track in step SP52 above, and all the clips at and after the OUT point (referred to as a "trimming adjustment point") of the first clip (50A) of the first video track 35C and all the clips at and after the trimming adjustment point of the second video track 35E if the second video track 35E in addition to the first video track 35C is set as the trimming adjustment track in step SP52 above.

When trimming adjustment is performed in this way, the GUI moves to the next step SP59, changes the material length of the trimming-adjusted first clip (50B) by the amount of adjustment and moves to the next step SP60.

On the contrary, if the detection result shows a decrease in step SP56 (that is, a retroceded state on the time scale), the GUI moves to step SP58 and moves the following clips forward by the amount corresponding to the adjustment. The "following clips" in this case refer to all the clips at and after the OUT point of the first clip (50A) of the first video track 35C if only the first video track 35C is set as the trimming adjustment track in step SP52 above, and all the clips at and after the OUT point (referred to as a "trimming adjustment point") of the first clip (50A) of the first video track 35C and all the clips at and after the trimming adjustment point of the second video track 35E if the second video track 35E in addition to the first video track 35C is set as the trimming adjustment track in step SP52 above.

When trimming adjustment is performed in this way, the GUI moves to-the next step SP59, changes the material length of the trimming-adjusted first clip (50B) by the amount of adjustment and moves to the next step SP60.

Step SP60 is a processing step executed to adjust the IN point side of the clip subject to trimming adjustment and the processing to coincide the IN point after adjustment with the original IN point position.

In this way, the GUI ends the trimming adjustment procedure in step SP61. According to this procedure, as shown in FIG. 18A, if the OUT point 50 OUT of the first clip 50A is moved forward, a blank area BLK is formed between the first clip 50A and the second clip 50B by the amount of length the first clip 50A is reduced as shown in FIG. 18B and the GUI moves forward the following clips 50B and 50C so as to fill the blank area BLK (FIG. 18C).

Figure 18:
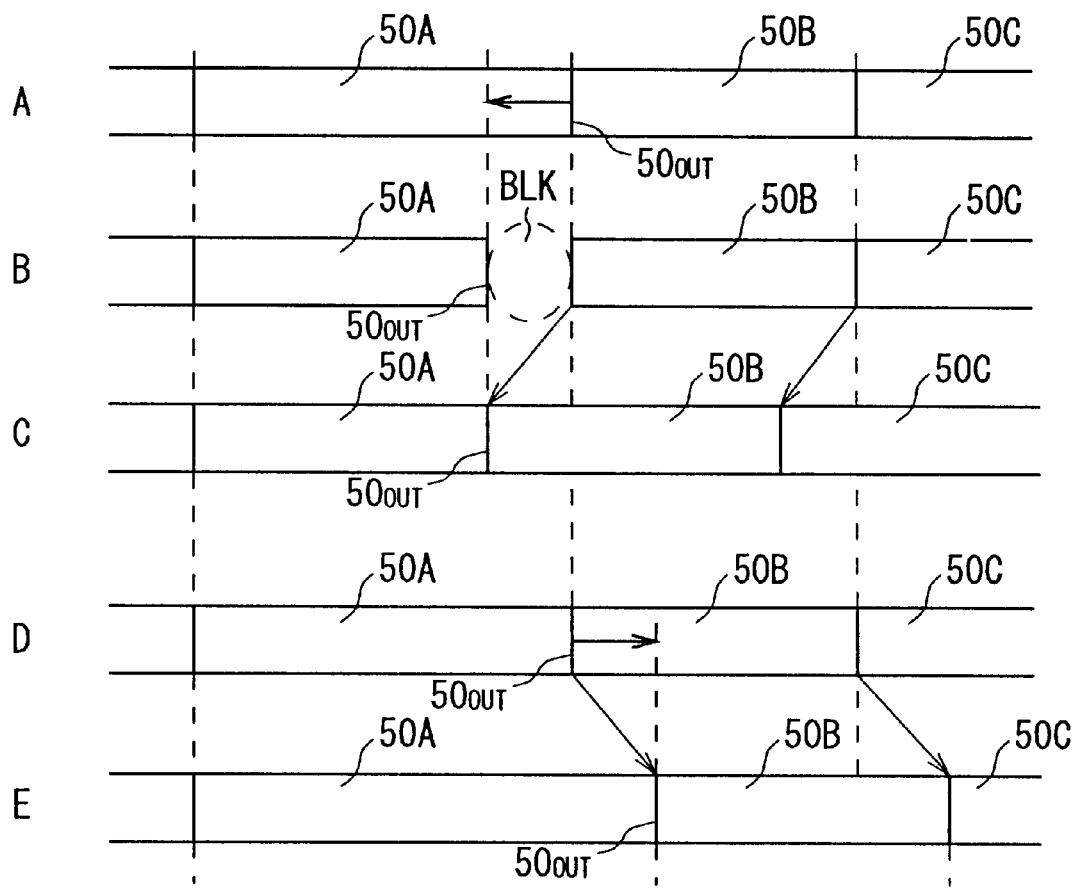
FIG. 18 is an outlined diagram to explain trimming adjustment of an OUT point.

Furthermore, if the OUT point of the first clip 50A is moved backward as shown in FIG. 18D, GUI moves backward the following clips 50B and 50C by the amount of length the first clip is lengthened as shown in FIG. 18E.

Figure 19:
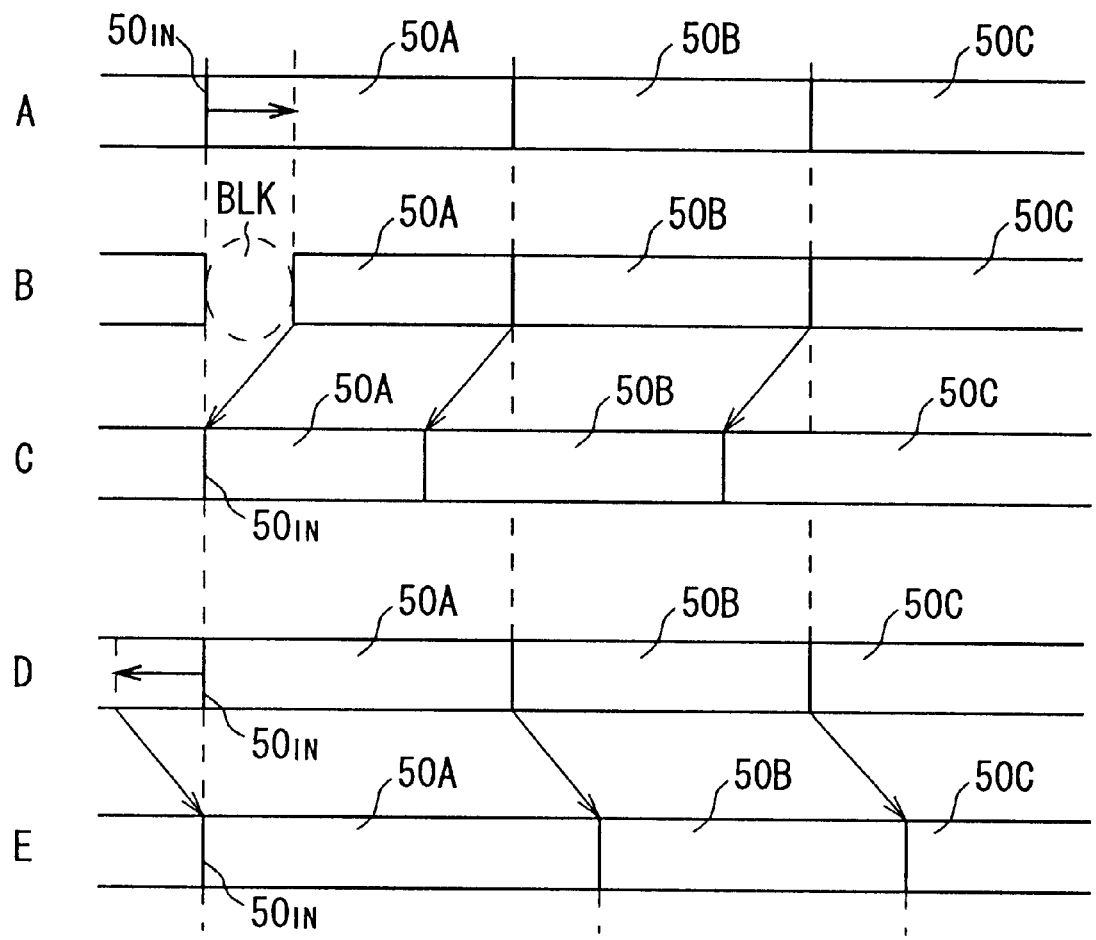
FIG. 19 is an outlined diagram to explain trimming adjustment of an IN point.

On the other hand, if the IN point 50IN of the first clip 50A is moved backward as shown in FIG. 19A, a blank area BLK is formed immediately before the first clip 50A as shown in FIG. 19B by the amount of length the first clip 50A is shortened and the GUI moves forward all the clips at and after the first clip 50A, that is, 50A, 50B and 50C so as to fill the relevant blank area BLK (FIG. 19C).

Furthermore, if the IN point of the first clip 50A is moved forward as shown in FIG. 19D, the GUI moves backward the IN point 50IN of the relevant first clip by the amount of length the first clip is lengthened as shown in FIG. 19E so as to coincide with the original position of the IN point, and also moves backward all the following clips 50B and 50C accordingly.

In this way, according to the trimming adjustment procedure, the correlation between all clips following the trimming-adjusted clip is maintained, and thus the continuity of clips is maintained.

Figure 20:
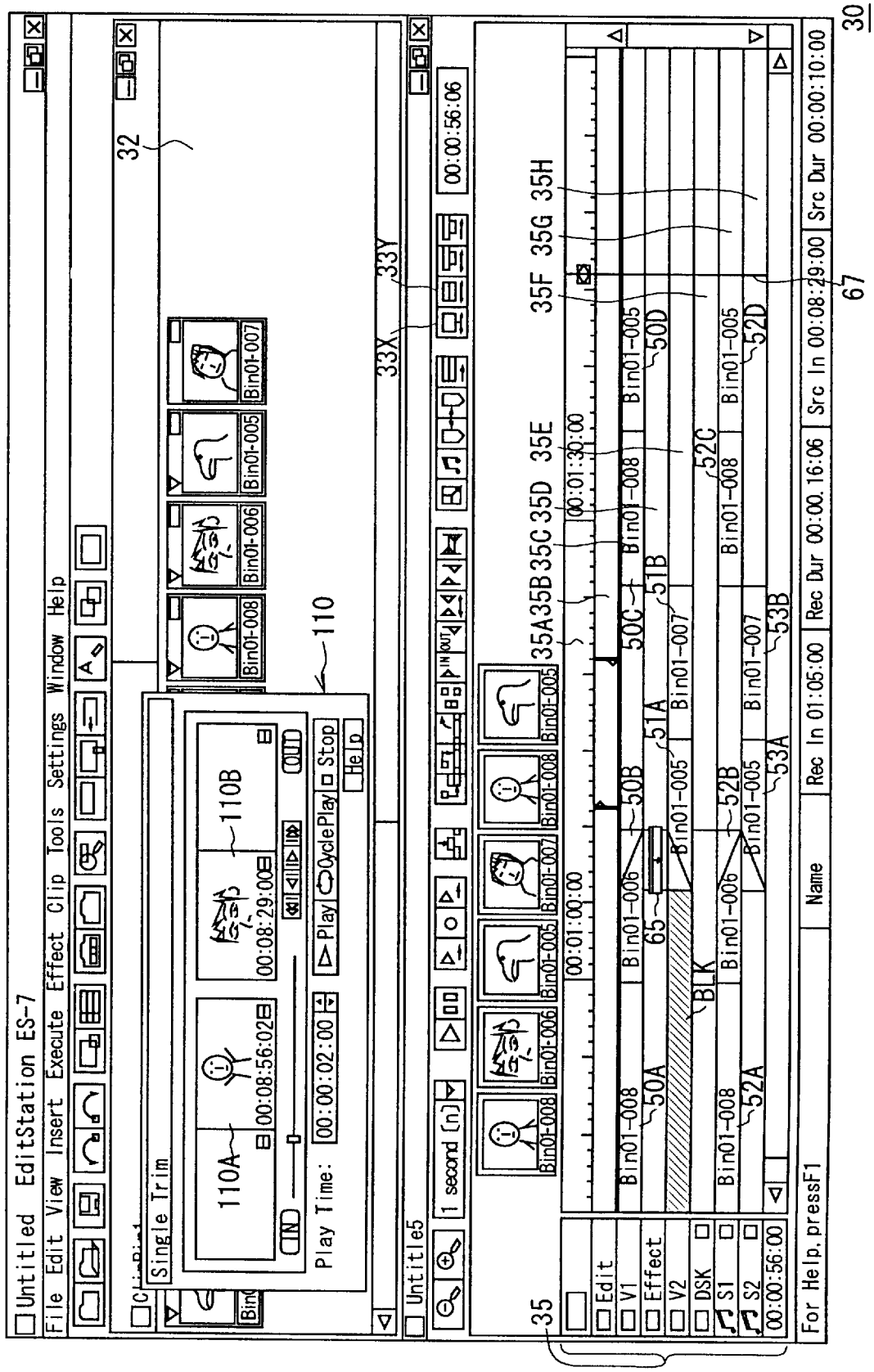
FIG. 20 is a still further outlined diagram showing the main screen of the GUI.

By the way, FIG. 20 shows a case where the OUT point of the first clip (50A) of the first video track 35C is moved backward. In this case, when the second video track 35E reflects the adjustment, then the GUI lengthens the length of a blank BLK at the time position of the OUT pint of the first clip of the first video track 35C according to the trimming adjustment of the first clip 50A, and in this way, moves backward all the clips following the relevant blank BLK (51A and 51B). In this way, since all the clips (50B, 50C and 50D) after the OUT point (trimming adjustment point) of the trimming-adjusted clip (50A) of the first video track 35C and all the clips (51A and 51B) after the trimming adjustment point in the second video track 35E are moved likewise, the correlation between the clips of the two video tracks is maintained and their continuity is maintained.

As in case of the video track, if trimming adjustment is performed on the clip (52A) for the first and second audio tracks 35G and 35H, the clips of the first audio track 35G and the second audio track 35H are moved while maintaining their positional correlation and thus the continuity of the clips is maintained.

By the way, trimming adjustment of only one track can be performed by clicking on the single trim button 33X (FIG. 20) provided at the top of the editing list creation section 35 instead of the setting by the mouse cursor above, and furthermore, trimming adjustment can also be reflected in a plurality of tracks by clicking the dual trim button 33Y (FIG. 20). Then, slide trimming adjustment, that is, adjusting the position on the time line of clips pasted on the time line tracks of the editing list creation section 35 without changing their lengths and contents is explained.

That is, the operator clicks on the clip subject to a slide trimming adjustment of the first video track 35C specified as a directly editable track of the editing list creation section 35 of the aforementioned main screen in FIG. 6 using the mouse cursor and at the same time clicks on the slide trim button 34A provided at the top of the editing list creation section 35, and in this way adjusts the OUT point of the adjacent clip on the left side of the selected clip and the IN point of the adjacent clip on the right side of the selected clip by the same amount of adjustment in the same direction and can move their positions on the time line without changing the contents of the selected clip. If the clips exist in the first and second video tracks 35C and 35E, this processing is performed on not only the track with the clip subject to slide trimming adjustment but also the other track. On the contrary, if the clip exists only in the track with the clip subject to slide trimming adjustment, the processing is performed only on this track.

Figure 21:
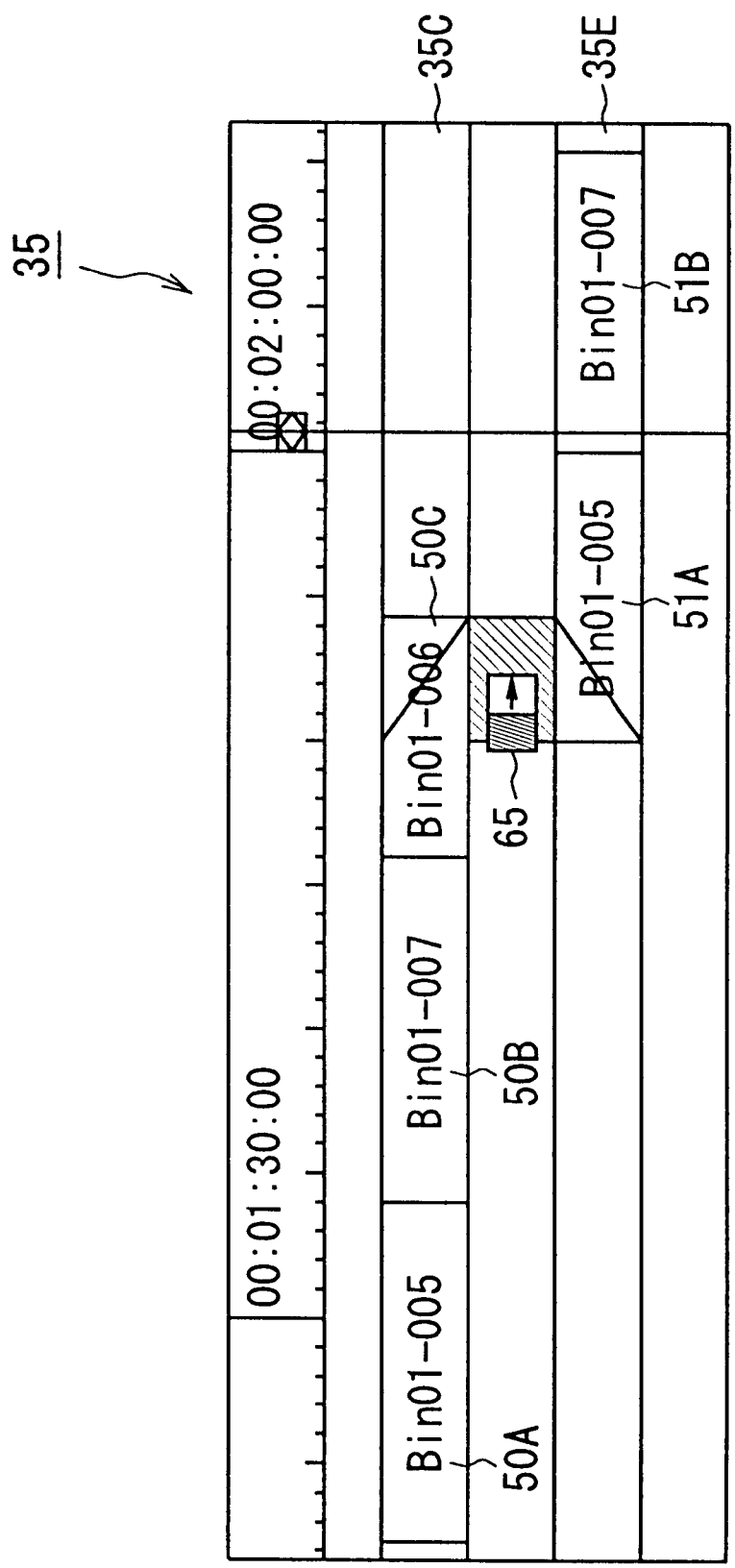
FIG. 21 is a partial outlined diagram showing an editing list creation section.
Figure 22:
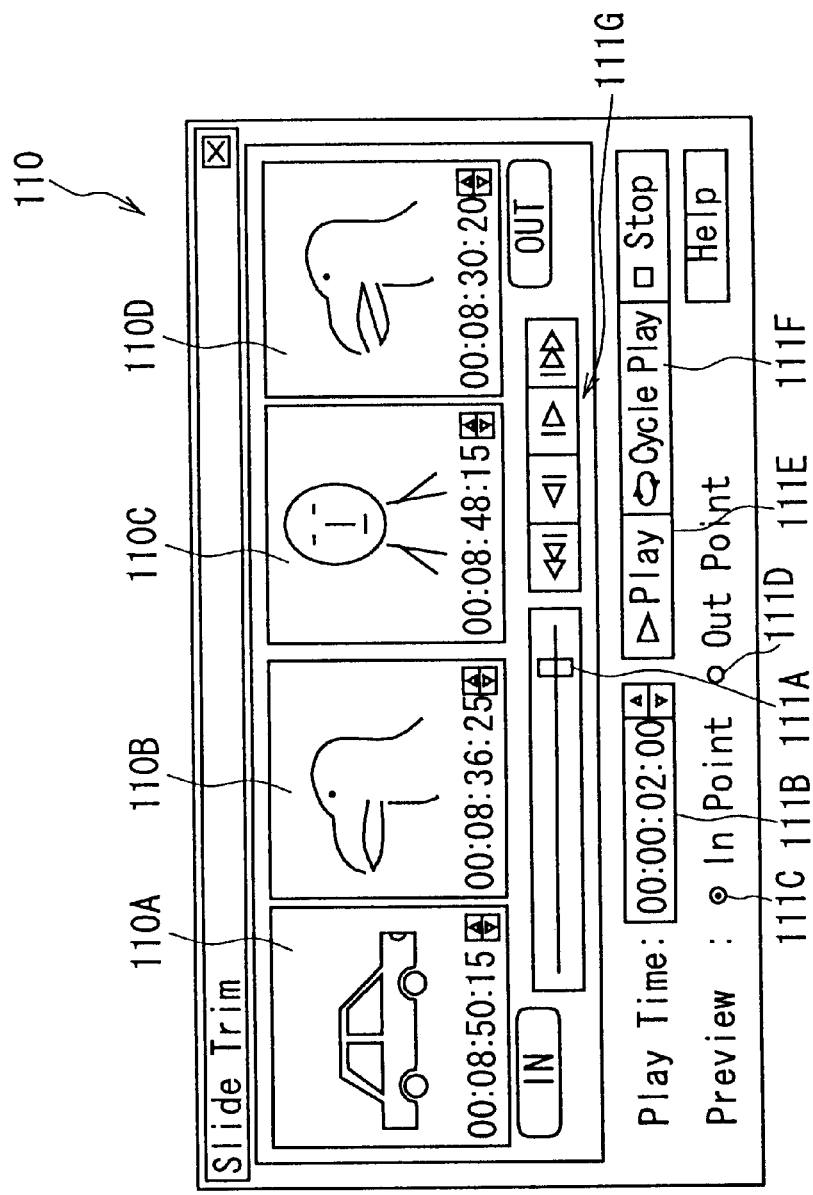
FIG. 22 is an outlined diagram showing a slide trim dialog window.

For example, if in FIG. 21 showing part of the editing list creation section 35, the operator specifies the second clip 50B of the first video track 35C as a clip subject to slide trimming adjustment, the GUI performs slide trimming adjustment of the clip 50B. In this case, as shown in FIG. 22, the main screen displays the slide trim dialog window 110.

This slide trim dialog window 110 displays a stamp image 110A at the OUT point of the adjacent clip 50A on the left side of the clip 50B subject to slide trimming adjustment, a stamp image 110B at the IN point of the clip 50B subject to slide trimming adjustment, a stamp image 110C at the OUT point of 50B subject to slide trimming adjustment and a stamp image 110D at the IN point of the adjacent clip 50C on the right side of the clip 50B subject to slide trimming adjustment.

Since in this slide trimming adjustment, the contents of the clip 50B subject to slide trimming adjustment are not changed, the stamp image 110B at the IN point and 110C at the OUT point are not changed by slide trimming adjustment, whereas 110A at the OUT point of the clip 50A before 50B and stamp image 110C at the IN point of the clip 50C after 50B are changed by slide trimming adjustment.

Figure 23:
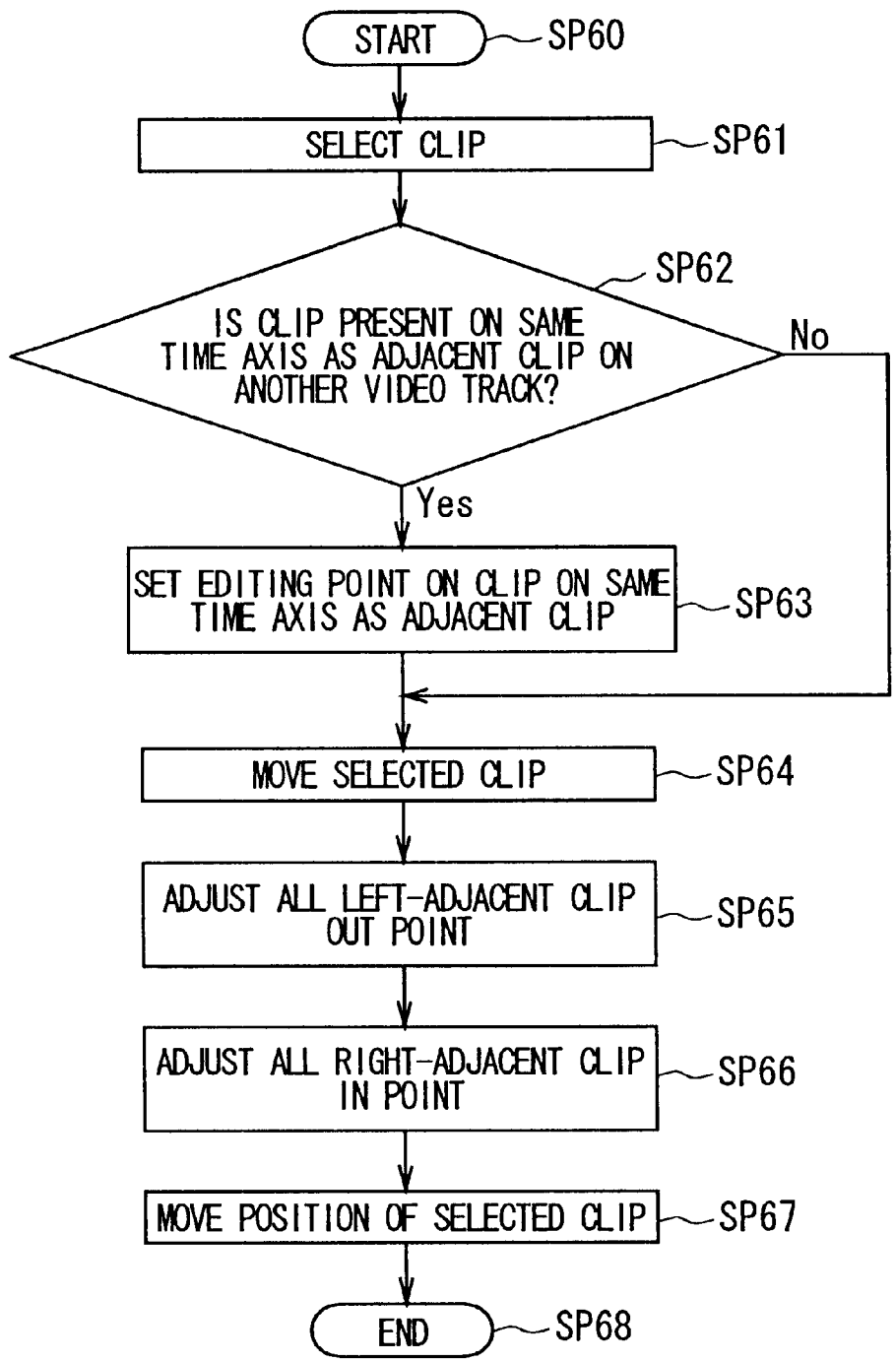
FIG. 23 is a flow chart showing a slide trimming adjustment procedure.

In this way, when the operator inputs a slide trimming adjustment command, the GUI enters the slide trimming adjustment procedure shown in FIG. 23 starting from step SP60 and starts slide trimming adjustment processing in step SP61.

Then, in the next step SP62, the GUI determines whether there is any clip at the time positions of the second video track, which are the same as the time positions of the IN point and OUT point of the clip 50B of the first video track 35C subject to slide trimming adjustment.

Figure 24:
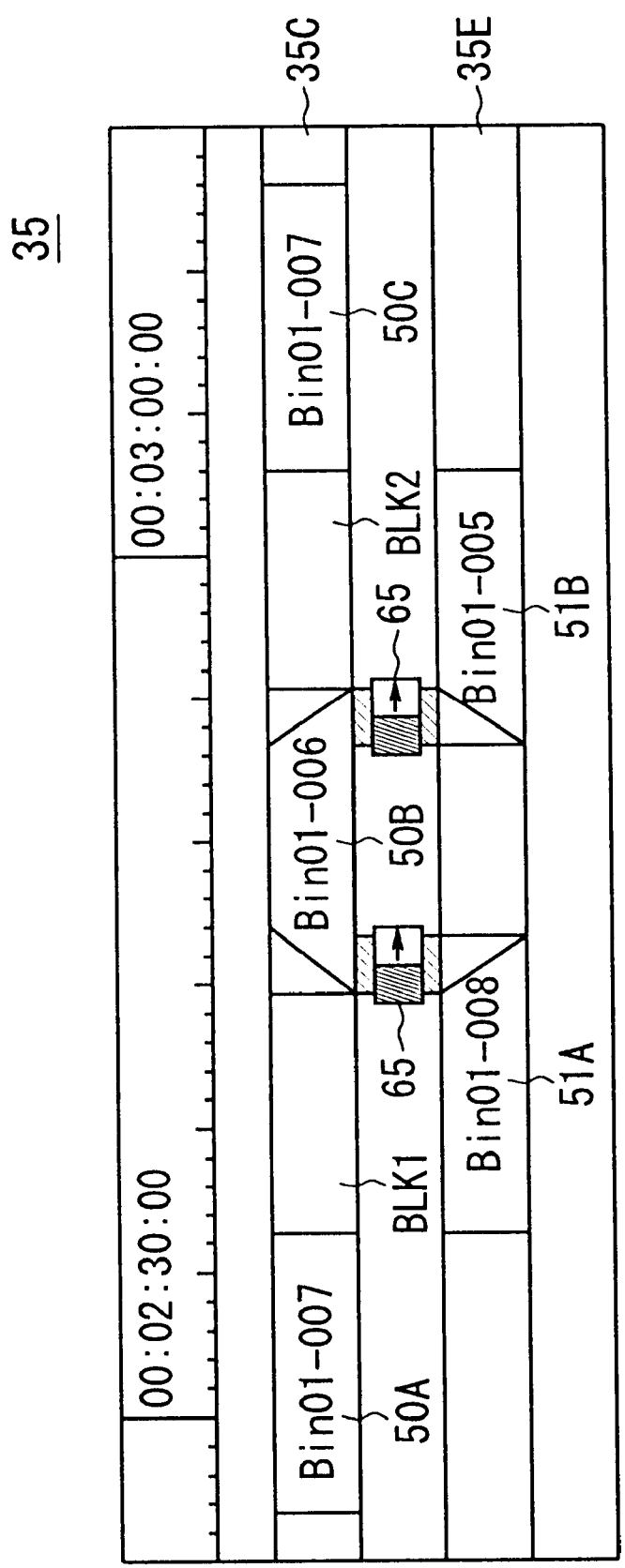
FIG. 24 is another partial outlined diagram showing the editing list creation section.

Here, if a positive result is obtained, this means that, for example, as shown in FIG. 24, the clip 51A of the second video track 35E exists at the same time position as that of the IN point of the clip 50B of the first video track 35C subject to slide trimming adjustment, and/or the clip 51B of the second video track 35E exists at the same time position as that of the OUT point of the clip 50B of the first video track 35C. At this time the GUI moves to step SP63 and as shown in FIG. 24, sets the OUT point of the clip 51A of the adjacent track at the same time position as that of the IN point of the clip 50B as an editing point and at the same time sets the IN point of the clip 51B of the adjacent track at the same time position as that of the OUT point of the clip 50B as another editing point and then moves to the next step SP64.

On the contrary, if a negative result is obtained in step SP62, this means that, as shown in FIG. 21, the clip of the second video track 35E does not exist at the same time position as that of the IN point of the clip 50B of the first video track 35C subject to slide trimming adjustment, and the clip of the second video track 35E does not exist at the same time position as that of the OUT point of the clip 50B of the first video track 35C, and at this time the GUI moves to step SP64.

Instep SP64, the GUI moves the clip 50B as specified by the operator. In this case, by sliding the slide bar 111A of the slide trim dialog window 110 shown in FIG. 22 or clicking on the Move button 111G using the mouse cursor, the operator can move the clip 50B rightward or leftward by any amount of movement.

Then, the GUI moves to the next step SP65 and moves the OUT point of the adjacent clip on the left side of the clip 50B by the amount of adjustment of the clip 50B as the clip 50B moves. In the case of FIG. 21, only the clip 50A is the adjacent clip on the left side of the clip 50B, but in case of the FIG. 24, the blank BLK1 and the clip 51A of the adjacent track 35E correspond to the clips in question.

Furthermore, the GUI moves to the next step SP66 and moves the IN point of the adjacent clip on the right side of the clip 50B by the amount of adjustment of the clip 50B as the clip 50B moves. In case of FIG. 21, only the clip 50C is the adjacent clip on the right side of the clip 50B, but in case of FIG. 24, the blank BLK2 and the clip 51B of the adjacent track 35E correspond to the clips in question.

In this way, the GUI actually moves the clip 50B on the time line track in step SP67 and ends the relevant procedure in step SP68.

Figure 25:
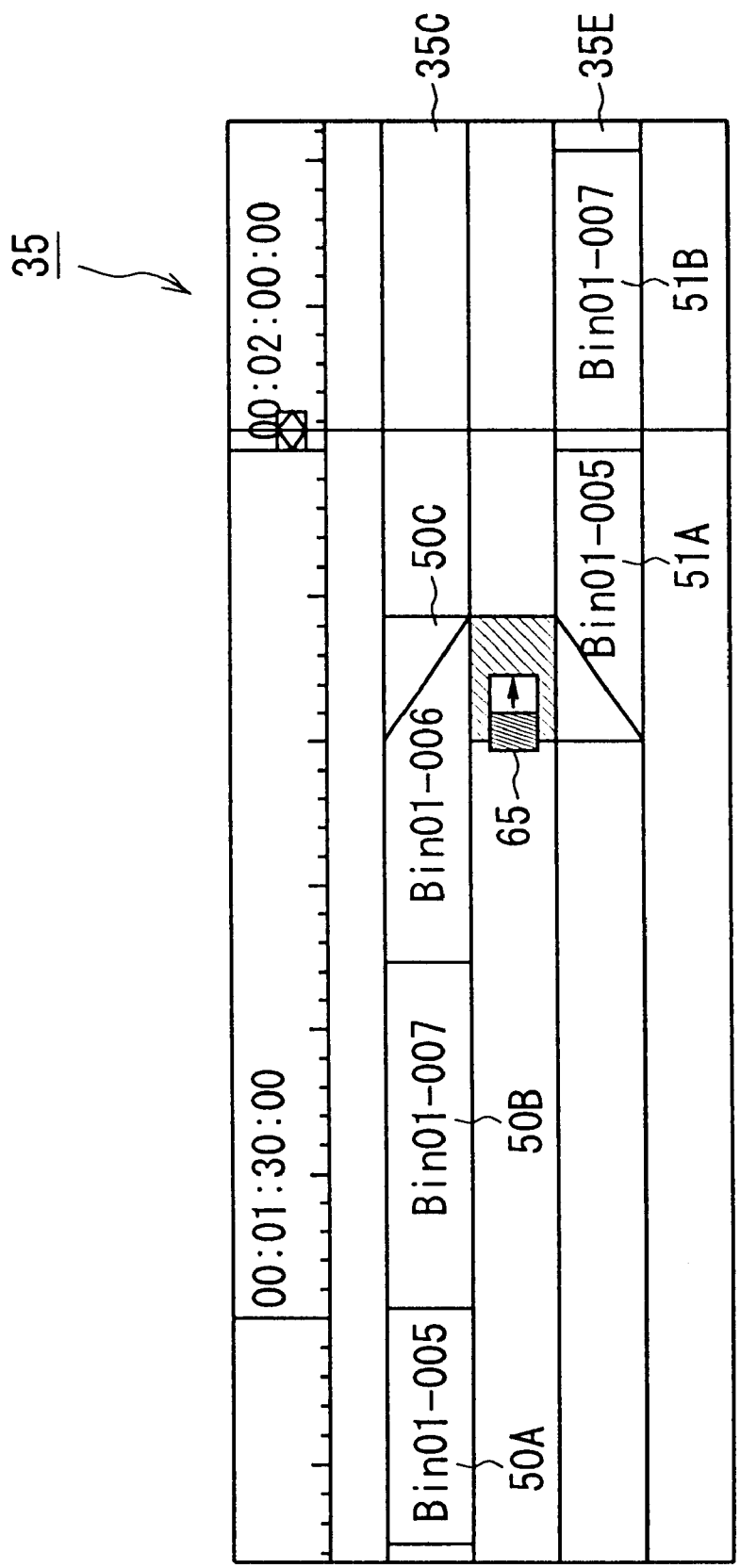
FIG. 25 is a further partial outlined diagram showing the editing list creation section.

When the slide trimming adjustment procedure is carried out in this way, the clip 50B shown in FIG. 21 moves forward (rightward), for example, on the time line without changing its contents and length, and as a result, as shown in FIG. 25, as the clip 50B moves, the OUT point of the adjacent clip 50A on the left side moves forward and at the same time the IN point of the adjacent clip 50C on the right side of the clip 50B moves forward.

Figure 26:
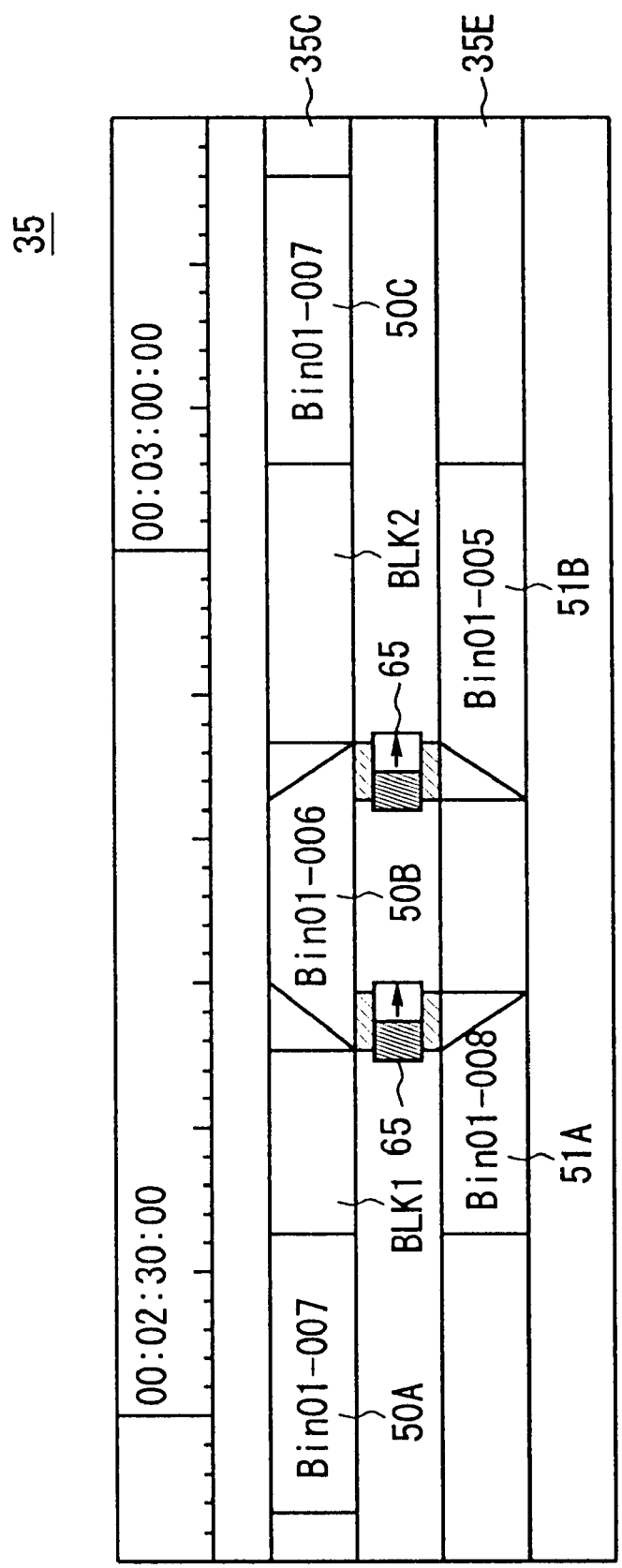
FIG. 26 is a still further partial outlined diagram showing the editing list creation section.

On the contrary, the clip 50B shown in FIG. 24, moves forward (rightward), for example, on the time line without changing its contents and length and as a result, as shown in FIG. 26, as the clip 50B moves, the adjacent blank BLK1 OUT point on the left side and the OUT point of the clip 51A at the same time position of the adjacent track 35E are moved forward, and at the same time the IN point of the adjacent blank BLK2 on the right side of the clip 50B and the IN point of the clip 51B at the same time position of the adjacent track 35E are moved forward.

In this way, slide trimming adjustment allows the relevant clip to be moved arbitrarily without changing the contents and length of the clip subject to adjustment and in this case, can maintain the correlation among other clips and maintain their continuity.

By the way, when slide trimming adjustment is carried out, if the operator clicks on the replay button 111E of the slide trim dialog window 110, then the GUI reproduces the IN point side or OUT point side of the clip to be adjusted. In this case, the IN point side or OUT point side can be specified by clicking on the replay point specification buttons 111B and 111C and the replay time can be set by replay time specification section 111B.

Furthermore, when the operator clicks on the cycle replay button 111F in the slide trim dialog window 110, the GUI repeatedly reproduces the IN point and OUT point of the clip to be adjusted.

The slide trimming adjustment processing can be executed not only in video tracks but also in audio tracks, and when slide trimming adjustment is carried out on a video track clip, an audio track clip is also adjusted accordingly. Furthermore, if the operator directly specifies slide trimming adjustment on an audio track, slide trimming adjustment is carried out on the relevant audio track.

Then, slip trimming adjustment, that is, moving and adjusting the contents of a clip pasted on each time line track of the editing list creation section 35 without changing its position on the time line is explained.

That is, by clicking on a clip subject to slip trimming adjustment of the first video track 35C specified as the directly editable track of the editing list creation section 35 of the aforementioned main screen in FIG. 6 using the mouse cursor and at the same time clicking on the slip trim button 33Z provided at the top of the editing list creation section 35, the operator can execute slip adjustment processing to change only the contents of the selected clip (that is, the extracting position on the original material of the hard disk 2 (FIG. 1) when creating the clip).

Figure 27:
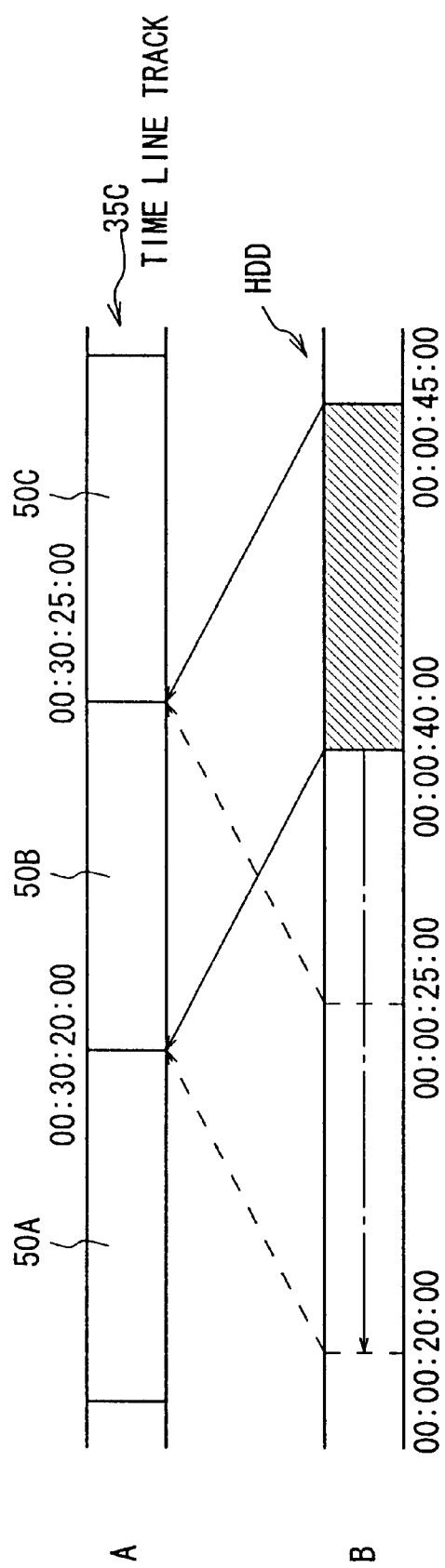
FIG. 27 is an outlined diagram to explain slip trimming processing.
Figure 28:
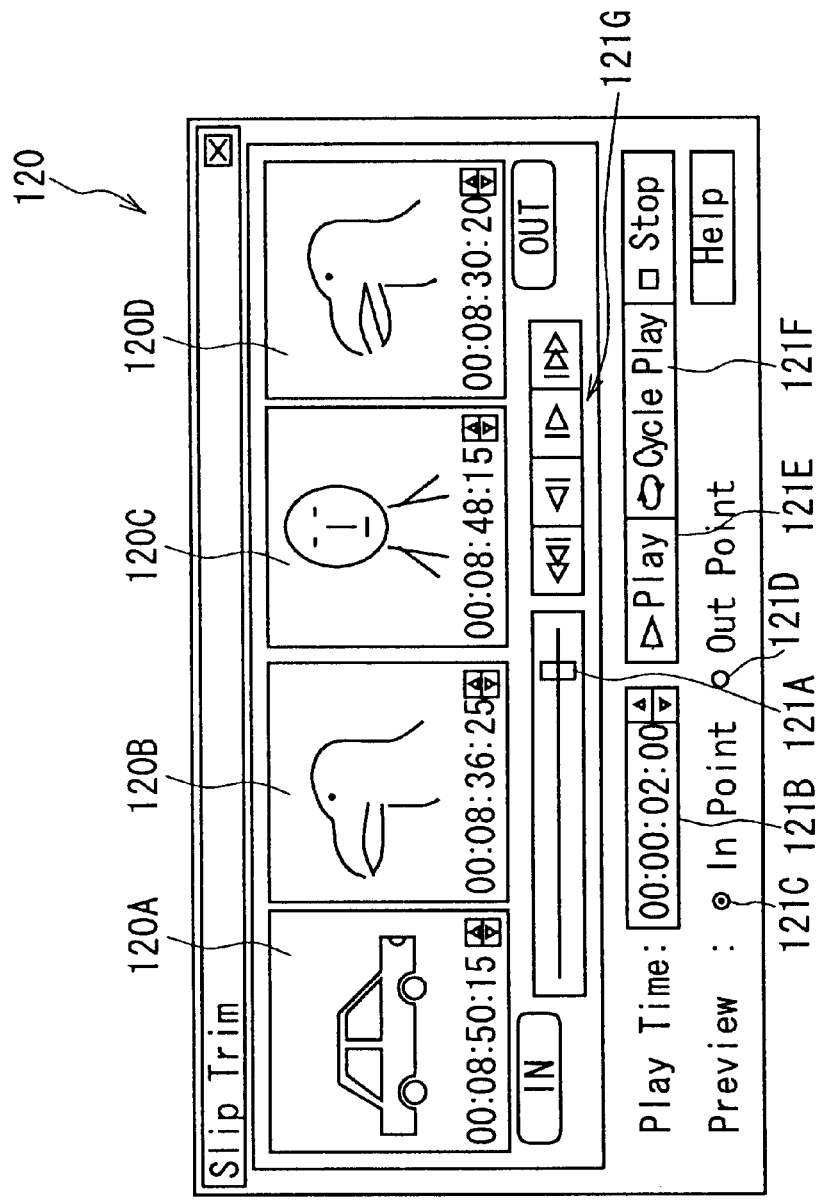
FIG. 28 is an outlined diagram showing a slip trim dialog window.

For example, in FIG. 27 that shows part of the editing list creation section 35, if the operator specifies the second clip 50B of the first video track 35C as the clip subject to slip trimming adjustment, the GUI executes slip trimming adjustment of the relevant clip 50B. In this case, a slip trim dialog window 120 is displayed on the main screen as shown in FIG. 28.

This slip trim dialog window 120 displays a stamp image 120A at the OUT point of the adjacent clip 50A on the left side of the clip 50B subject to slip trimming adjustment, stamp image 120B at the IN point of the clip 50B subject to slip trimming adjustment, stamp image 120C at the OUT point of the clip 50B subject to slip trimming adjustment and stamp image 120D at the IN point of the adjacent clip 50C on the right side of the clip 50B subject to slip trimming adjustment.

In this slip trimming adjustment, since the contents of the clips 50A and 50C adjacent to the clip 50B subject to slip trimming adjustment do not change, stamp images 120A and 120D do not change by slip trimming adjustment, whereas the stamp image 120B at the IN point and the stamp image 120C at the OUT point of the clip 50B subject to slip trimming adjustment change by slip trimming adjustment.

In this way, when a slip trimming adjustment command is input by the operator, the GUI starts executing slip trimming adjustment. Then, when the operator clicks on the slide bar 121A or Move button 121G of the slip trim dialog window 120 shown in FIG. 28, the contents of the clip 50B to be adjusted moves on the original material. By the way, the slide bar 121A can move the contents of the clip to be adjusted continuously, while the Move button 121G can move the contents of the clip to be adjusted in 10-frame units.

As shown in FIG. 27A, when slip trimming adjustment is performed on the clip 50B set at time code "00:30:20:00" to "00:30:25:00" of the first video track 35C, if the contents of the clip 50B subject to the relevant slip trimming adjustment is the material data at time code "00:00:40:00" to "00:00:45:00" on the hard disk 2 (FIG. 1) as shown in FIG. 27B, then if the operator specifies to extract the contents of the clip 50B from another position of the material by operating the slip trim dialog window 120, the computer 3 (FIG. 1) replaces the contents to be pasted as the clip 50B according to the specification by the material data from another position shown in FIG. 27B (that is, range from time code "00:00:20:00" to "00:00:25:00").

In this way, the operator can change the contents of the target clip 50B without being aware of other adjacent clips 50A and 50C before and after the clip 50B subject to slip trimming adjustment.

By the way, if the operator clicks on the replay button 121E in the slip trim dialog window 120 during slip trimming adjustment, the GUI reproduces the IN point or OUT point side of the clip to be adjusted. The IN point or OUT point side in this case can be specified by clicking on the replay point specification button 121C or 121D and the replay time can be set by the replay time specification section 121B.

Furthermore, when the operator clicks on the Cycle Play button 121F in the slip trim dialog window 120, the GUI repeatedly reproduces the adjustment clip IN point or OUT point.

Slip trimming adjustment processing can be executed not only on video tracks but also on audio tracks. If slip trimming adjustment is applied to a clip in a video track, a clip in an audio track is subjected to slip trimming adjustment in response to this. If the operator directly specifies slip trimming adjustment for the audio track, slip trimming adjustment is applied to the relevant audio track.

(5) Operation and Advantages of Embodiment

In the configuration above, when editing the time line track of the editing list creation section 35 (FIG. 6) displayed on the main screen, if the operator specifies a desired clip and moves its position on the time line track, then, in response to this, the GUI adjusts the OUT point of the adjacent clip on the left side (upstream side) of the relevant clip and the IN point of the adjacent clip on the right side (downstream side) by the amount of movement of the clip, and in this way, even if the clip is moved the continuity between the adjacent clips on both sides and the moving clip is maintained.

Moreover, in this case, the IN point or OUT point of the clip in another time line track different from the time line track whose clip has been moved is adjusted according to the amount of movement of the clip, and therefore the continuity between clips in a plurality of time line tracks is maintained even if the clips are moved.

Thus, the configuration shown above can further simplify editing work when creating an editing list.

Furthermore, in the configuration above, when editing the time line track of the editing list creation section 35 (FIG. 6) displayed on the main screen, if the operator specifies a desired clip and changes the material contents on the original material, then in response to this, the GUI moves the contents on the original material such as registered data in the hard disk 2 and memory without moving the position of the relevant clip on the time line accordingly.

This allows the contents of the relevant clip to be changed while maintaining its position.

Thus, the configuration shown above can further simplify editing work when creating en editing list.

Furthermore, in the configuration above, if the operator selects and specifies a desired time line track from among a plurality of time line tracks of the editing list creation section 35 (FIG. 6) displayed on the main screen, only the specified track reflects the result of the editing work. A specific color can be assigned to the specified track in the editing list creation section 35, allowing the operator to easily comprehend the selection/specification condition.

Therefore, when the operator selects/specifies all of the plurality of tracks for a series of clips consecutively set across a plurality of tracks, even if editing is applied to some clips, the correlation and continuity between the clips are maintained because the clips in all the related tracks move according to the editing work.

Furthermore, influences of the editing are not reflected in the tracks that are not selected or specified, and therefore the operator can carry out the setting so that the editing does not affect the desired tracks.

Therefore, if the operator adds a clip to an arbitrary clip, the GUI moves backward all clips at and after the editing point of the selected/specified track by the length corresponding to the inserted clip to reflect the influence of the editing and in this way, the other clips following the newly inserted clip at and after the editing point can maintain their original correlation.

Furthermore, if the operator deletes a certain clip, then the GUI moves forward all clips at and after the editing point of the selected/specified track by the length corresponding to the clip to be deleted to reflect the influence of the editing, and in this way the other clips following the deleted clip at and after the editing point can maintain their original correlation.

With such a configuration, it is possible not only to reflect the influences of editing in a specific track selected/specified by the operator but also to maintain the correlation and continuity of the clips at and after the editing point in the selected/specified track, allowing the operator to further simplify the editing work.

Furthermore, in the configuration above, when carrying out editing on the time line track of the editing list creation section 35 (FIG. 6) displayed on the main screen, if the operator sets a mark-in mark 101 and mark-out mark 102 on the time axis, the GUI inserts a new clip on the time line track based on these two marks.

In this way, the operator can set editing points by only adding the mark-in mark 101 and mark-out mark 102.

Furthermore, by adding a timing mark 105 to the mark-in mark 101 or mark-out mark 102, it is possible to insert the IN point or OUT point of the clip to be inserted in accordance with the reference position (mark-in mark 101 or mark-out mark 102 with a timing mark 105 added).

Thus, such a configuration can further simplify the editing work when creating an editing list.

Furthermore, in the configuration above, when editing the time line track of the editing list creation section 35 (FIG. 6) displayed on the main screen, the operator can change the length of a desired clip by moving the IN point or OUT point of the clip. In this case, according to the change at the adjustment point (IN point or OUT point) of the clip whose length was changed, the GUI moves the clips at and after the relevant adjustment point in accordance with the change at the adjustment point, and in this way the clips at and after the relevant adjustment point can maintain their correlation and continuity.

This allows the operator to adjust the length of the relevant clip and maintain the correlation of the clips that follow this clip by such a simple operation as to move the IN point and OUT point of the clip whose length is to be adjusted.

Furthermore, by specifying a plurality of tracks as the tracks whose correlation is to be maintained, it is possible to move clips in a plurality of tracks as the adjustment point moves, thereby making it possible to maintain the correlation and continuity of the clips in a plurality of tracks.

Thus, such a configuration can further simplify the editing work when creating an editing list.

As shown above, according to the present embodiment, the edit data creation apparatus that creates edit data specifying editing contents to arbitrarily combine edit materials, moves the position of the edit materials on the edit data and adjusts the end point of a first adjacent edit material on the upstream of the relevant edit material on the time axis of the edit data and the start point of a second adjacent edit material on the downstream of the relevant edit material on the time axis of the edit data according to the amount of movement of their respective edit materials, making it possible, even if the edit materials are moved, to maintain the continuity between the adjacent edit materials on both sides and the moved edit material.

Furthermore, according to the present embodiment, the edit data creation apparatus that creates edit data specifying editing contents by arbitrarily combining edit materials made up of extracted part of data on the original material, moves the contents of the edit material on the original material with the position of the edit material on the edit data maintained, and changes the contents of the edit material at the position where the edit material is maintained, making it possible to change the contents without moving the position of the edit material on the edit data.

Furthermore, according to the present embodiment, the edit data creation apparatus that creates edit data specifying editing contents to arbitrarily combine edit materials, sets an edit data change area to change the edit data accompanied with the editing on the edit data in the edit data, allowing influences of the editing to be reflected in only the edit data desired by the operator in the editing work on the edit data thereby making it possible to maintain a correlation between the edit materials before the editing.

Furthermore, according to the present embodiment, the edit data creation apparatus that creates edit data specifying editing contents to arbitrarily combine edit materials, presets an editing point for editing on the edit data and inserts a new edit material on the edit data based on the set editing point, making it possible for the operator to easily insert the new edit material at a desired position on the edit data.

Furthermore, according to the present embodiment, the edit data creation apparatus that creates edit data specifying editing contents to arbitrarily combine edit materials, adjusts the start point or end point of an arbitrary edit material on the edit data as the adjustment point, changes the length of the edit material on the edit data and moves the edit data at and after the adjustment point of the edit material according to the adjustment of the adjustment point, making it possible to adjust the length of the desired edit material on the edit data while maintaining the correlation and continuity between the edit materials at and after the adjustment point.

In this way, it is possible to create desired edit data much more easily.

(6) Other Embodiments

The embodiment above described the case where the present invention is applied to the editing apparatus 1 configured as shown in FIG. 1 and FIG. 2. However, the present invention is not limited to this, but is applicable to a variety of apparatuses creating an editing list based on operations by the operator.

INDUSTRIAL APPLICABILITY

The present invention is applicable to an edit data creation apparatus and edit data creation method that create edit data to execute editing processing arbitrarily combining a plurality of edit materials.

What is claimed is:

1. An edit data creation apparatus that creates edit data specifying edit contents to arbitrarily combine edit materials, comprising:

material moving means for moving positions of said edit materials on said edit data;

first adjusting means for adjusting a start point of an edit material and an end point of said edit material;

second adjusting means for adjusting an end point of a first adjacent edit material that is upstream of a moved edit material without changing the time line position of said edit material, and a start point of a second adjacent edit material that is downstream of said moved edit material without changing the time line position of said edit material, according to the amount of movement of respective edit materials thereof;

first display means for visibly displaying a first stamp image at the end point of a first adjacent edit material upstream of said moved edit material;

second display means for visibly displaying a second stamp image at the start point of said edit material;

third display means for visibly displaying a third stamp image at the end point of said edit material; and fourth display means for visibly displaying a fourth stamp image at the start point of a second adjacent edit material that is downstream of said moved edit material.

2. The apparatus of claim 1 wherein, in response to a user activation via a cursor on a selected clip subject to slip trimming adjustment of a video track specified as a directly editable track of an editing list creation section of a main editing screen, and a concurrent user selection of a slip trim input in said editing list creation section, slip adjustment processing is executed to change only the contents of the selected clip.

3. The apparatus of claim 2 wherein said first, second, third and fourth images are displayed within a slip trim dialog window within said main editing screen.

4. The apparatus of claim 3, further comprising replay activation means within said slip trim dialog window to enable a selective reproduction of an IN point or OUT point side of a clip to be adjusted.

5. The apparatus of claim 4, further comprising cycle play means within said slip trim dialog window to selectively enable a repeated reproduction of the adjustment clip IN point or OUT point.

6. A method for creating edit data specifying edit contents to arbitrarily combine edit materials, comprising the steps of:

moving positions of said edit materials on said edit data;

adjusting a start point of an edit material and an end point of said edit material;

adjusting an end point of a first adjacent edit material that is upstream of a moved edit material without changing the time line position of said edit material, and adjusting a start point of a second adjacent edit material that is downstream of said moved edit material without changing the time line position of said edit material, according to the amount of movement of respective edit materials thereof;

visibly displaying a first stamp image at the end point of a first adjacent edit material upstream of said moved edit material;

visibly displaying a second stamp image at the start point of said edit material;

visibly displaying a third stamp image at the end point of said edit material; and visibly displaying a fourth stamp image at the start point of a second adjacent edit material that is downstream of said moved edit material.

7. The method of claim 6 wherein, in response to a user activation via a cursor on a selected clip subject to slip trimming adjustment of a video track specified as a directly editable track of an editing list creation section of a main editing screen, and a concurrent user selection of a slip trim input in said editing list creation section, slip adjustment processing is executed to change only the contents of the selected clip.

8. The method of claim 7 wherein said first, second, third and fourth images are displayed within a slip trim dialog window within said main editing screen.

9. The method of claim 8,further comprising reproducing an IN point or OUT point side of a clip to be adjusted in response to a user activation of a replay activation input within said slip trim dialog window.

10. The method of claim 9, further comprising repeatedly reproducing the adjustment clip IN point or OUT point in response to a user activation of a cycle play input within said slip trim dialog window.

* * * * *